United States Patent
Filsfils et al.

(10) Patent No.: US 12,160,365 B2
(45) Date of Patent: Dec. 3, 2024

(54) CIRCUIT-STYLE NETWORK WITH CO-ROUTED BIDIRECTIONAL NETWORK PATHS

(71) Applicant: Cisco Technology, Inc., San Jose, CA (US)

(72) Inventors: Clarence Filsfils, Brussels (BE); Zafar Ali, Hicksville, NY (US); Francois Clad, Strasbourg (FR); Bertrand Herbert Guy Duvivier, Wepion (BE); Mikhail Koldychev, Ottawa (CA); Rakesh Gandhi, Stittsville (CA); Sagar Soni, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 17/741,241

(22) Filed: May 10, 2022

(65) Prior Publication Data

US 2023/0021278 A1 Jan. 19, 2023

Related U.S. Application Data

(60) Provisional application No. 63/220,940, filed on Jul. 12, 2021.

(51) Int. Cl.
*H04L 45/42* (2022.01)
*H04L 45/00* (2022.01)
(Continued)

(52) U.S. Cl.
CPC .............. *H04L 45/42* (2013.01); *H04L 45/28* (2013.01); *H04L 45/566* (2013.01); *H04L 45/74* (2013.01)

(58) Field of Classification Search
CPC ....... H04L 45/42; H04L 45/28; H04L 45/566; H04L 45/74
(Continued)

(56) References Cited

U.S. PATENT DOCUMENTS

| 9,130,743 | B2 * | 9/2015 | Levin | H04W 4/70 |
| 9,461,877 | B1 * | 10/2016 | Nadeau | H04Q 3/0062 |

(Continued)

FOREIGN PATENT DOCUMENTS

| WO | WO-2010017176 A1 * | 2/2010 | H04L 12/5695 |
| WO | 2016115850 A1 | 7/2016 | |
| WO | 2021/135414 | 7/2021 | |

OTHER PUBLICATIONS

A Policy-Based Hierarchical Approach for Management of Grids and Networks T. Fioreze; R. Neisse; L. Granville; M.J. Almeida; A. Pras 2006 IEEE/IFIP Network Operations and Management Symposium NOMS 2006 (Year: 2006).*

(Continued)

*Primary Examiner* — Jeffrey R Swearingen
(74) *Attorney, Agent, or Firm* — Polsinelli P.C.

(57) ABSTRACT

Disclosed are systems, apparatuses, methods, and computer-readable media to implement circuit-style network with co-routed bidirectional network paths. A method includes receiving a request for a circuit policy between a source node and a destination node, the circuit policy defining a co-routed bidirectional policy between the source node and the destination node; requesting a path compute service to identify a path between the source node and the destination node that satisfies the circuit policy through a first network; receiving a path identifying a first set of network nodes that satisfy the circuit policy; configuring each node in the first set of network nodes within the first network with the circuit policy; and establishing a connection using the path that (Continued)

satisfies the circuit policy between the source node and the destination node.

18 Claims, 16 Drawing Sheets

(51) Int. Cl.
   *H04L 45/28* (2022.01)
   *H04L 45/74* (2022.01)
(58) Field of Classification Search
   USPC .......................................... 709/238
   See application file for complete search history.

(56) References Cited

U.S. PATENT DOCUMENTS

| | | | |
|---|---|---|---|
| 9,531,677 B1* | 12/2016 | Rodgers | ............... H04L 47/70 |
| 10,587,505 B1 | 3/2020 | Morris | |
| 2002/0194339 A1 | 12/2002 | Lin et al. | |
| 2006/0088063 A1* | 4/2006 | Hartung | ........... H04N 21/64707 |
| | | | 370/395.2 |
| 2015/0131432 A1 | 5/2015 | Long | |
| 2016/0182400 A1* | 6/2016 | Ceccarelli | ............. H04L 45/507 |
| | | | 370/437 |
| 2017/0250908 A1* | 8/2017 | Nainar | ..................... H04L 45/04 |
| 2019/0317812 A1* | 10/2019 | Gebara | ................... G06N 3/084 |
| 2020/0127913 A1* | 4/2020 | Filsfils | ..................... H04L 45/04 |
| 2020/0204479 A1 | 6/2020 | Filsfils et al. | |
| 2021/0306260 A1* | 9/2021 | Watts | ..................... H04L 45/04 |
| 2021/0328905 A1 | 10/2021 | Skalecki | |

OTHER PUBLICATIONS

A Policy-Based Hierarchical Approach for Management of Grids and Networks T. Fioreze; R. Neisse; L. Granville; M.J. Almeida; A. Pras 2006 IEEE/IFIP Network Operations and Management Symposium NOMS 2006 (Year: 2006) (Year: 2006).*
International Search Report and Written Opinion for International Application No. PCT/US2022/036472, mailed Oct. 6, 2022, 9 Pages.

* cited by examiner

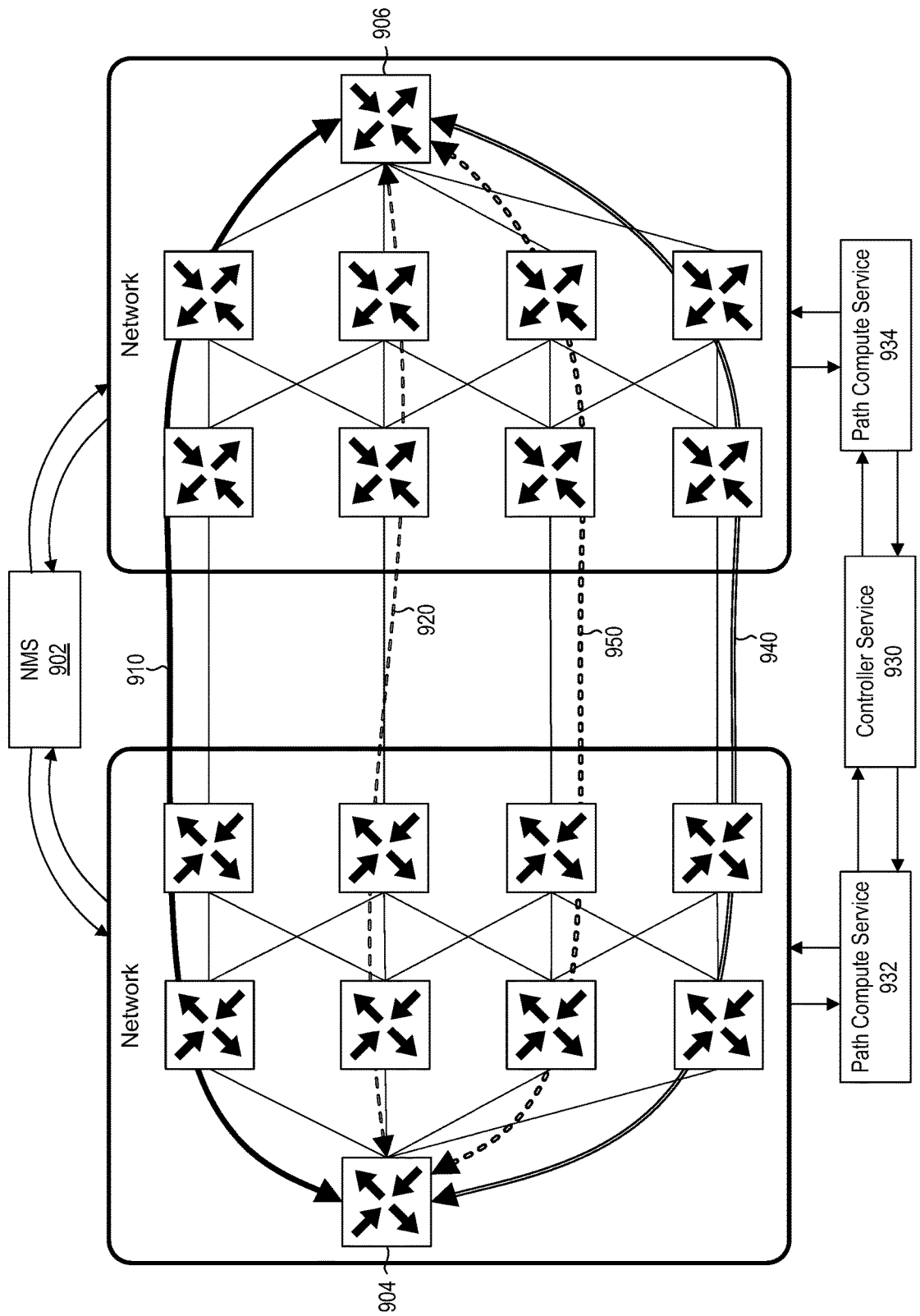

CIRCUIT-STYLE NETWORK WITH CO-ROUTED BIDIRECTIONAL NETWORK PATHS

CROSS-REFERENCE TO RELATED APPLICATIONS

This application claims priority to U.S. Provisional Patent Application No. 63/220,940, filed on Jul. 12, 2021, the contents of which are incorporated herein by reference in its entirety.

BACKGROUND

The communications industry is rapidly changing to adjust to emerging technologies and ever-increasing customer demand. This customer demand for new applications and increased performance of existing applications is driving communications networks and system providers to employ networks and systems having greater speed and capacity (e.g., greater bandwidth). In trying to achieve these goals, a common approach taken by many communications providers is to use packet switching technology using Internet Protocol (IP). IP packets are typically forwarded in a network based on one or more values representing network nodes or paths.

Segment routing (SR) is a network technology that can enhance packet switching using a source routing paradigm. SR is applicable to both Multiprotocol Label Switching (SR-MPLS) and IPv6 (SRv6) data planes. In an SR network, a source node (i.e., a headend or ingress provider edge (PE) node) chooses a path and encodes it in the packet header as an ordered list of segments that provide a unidirectional list of segments that identify the designated routing path towards a destination node (i.e., a tailend or egress provider edge (PE) or endpoint node).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example environment for managing elephant flows in a circuit-style network configuration, in accordance with some examples;

DETAILED DESCRIPTION

Figure 1:
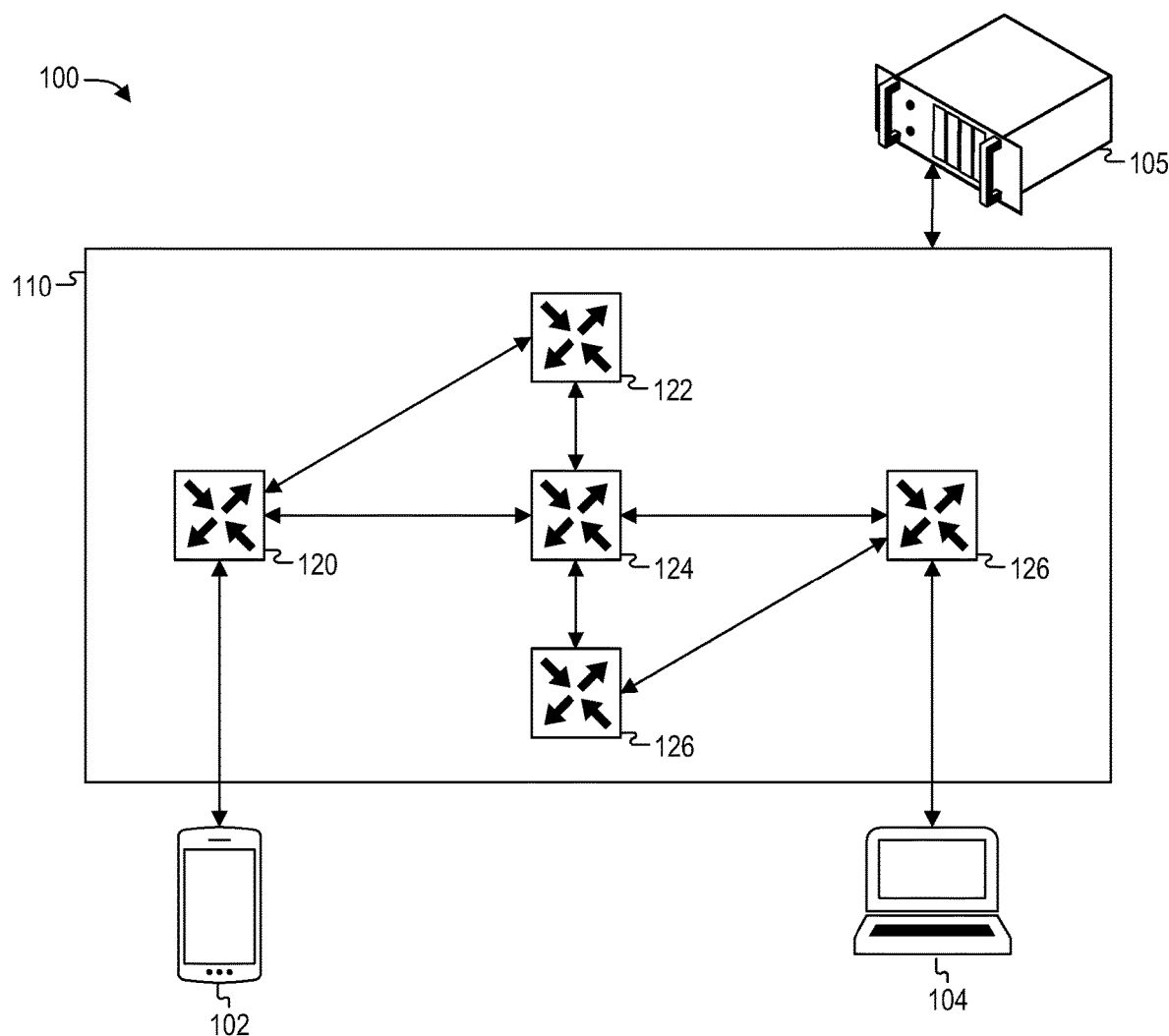
FIG. 1 illustrates an example of a segment routing (SR) network according to an example of the instant disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are disclosed for configuring circuit connections (e.g., dedicated ethernet LAN (ELAN) connections, virtual private wire services (VPWS), virtual private LAN services (VPLS), pseudo-wires (PW), etc.) in segment routing (SR) networks. In some examples, circuit connections provide end-to-end circuit-style segment routing traffic engineering (SR-TE) as an IP/MPLS transport technology. In some cases, the end-to-end circuit-style SR-TE can mimic time division multiplexing (TDM)/optical transport network (OTN) behavior and service level agreements (SLA) by controlling and managing the bandwidth (BW) reservation and BW utilization end-to-end based on path computation element (PCE). Illustratrative examples of a PCE includes a Crossworks optimization engine (COE) that may be a part of a controller or network management system (NMS) and SR-TE (e.g., Cisco's IOS-XR Operating System) foundations. The circuit-style connections can utilize co-routed bidirectional network connections that are setup, maintained and monitored to ensure that the qualities of a circuit connection can be guaranteed to be able to provide connection-oriented services to the customers.

In some examples, systems and techniques are described for circuit-style network performance in packet switched networks. Disclosed are systems, apparatuses, methods, and computer-readable media for configuring bidirectional co-routed network connections. According to at least one example, a method is provided for configuring bidirectional co-routed network connections. The method includes: receiving a request for a circuit policy between a source node and a destination node, the circuit policy defining a co-routed bidirectional policy between the source node and the destination node; requesting a path compute service to identify a path between the source node and the destination node that satisfies the circuit policy through a first network; receiving a path identifying a first set of network nodes that satisfy the circuit policy; configuring each node in the first set of network nodes within the first network with the circuit policy; and establishing a connection using the path that satisfies the circuit policy between the source node and the destination node, wherein a packet transmitted with the circuit policy includes addresses of at least a portion of the first set of network nodes in the packet.

In another example, an apparatus for configuring bidirectional co-routed network connections is provided that includes at least one memory and at least one processor coupled to the at least one memory. The at least one processor is configured to: receive a request for a circuit policy between a source node and a destination node, the circuit policy defining a co-routed bidirectional policy between the source node and the destination node; request a path compute service to identify a path between the source node and the destination node that satisfies the circuit policy through a first network; receive a path identifying a first set of network nodes that satisfy the circuit policy; configure each node in the first set of network nodes within the first network with the circuit policy; and establish a connection using the path that satisfies the circuit policy between the source node and the destination node, wherein a packet transmitted with the circuit policy includes addresses of at least a portion of the first set of network nodes in the packet.

In another example, a non-transitory computer-readable medium is provided that has stored thereon instructions that, when executed by one or more processors, cause the one or more processors to: receive a request for a circuit policy between a source node and a destination node, the circuit policy defining a co-routed bidirectional policy between the source node and the destination node; request a path compute service to identify a path between the source node and the destination node that satisfies the circuit policy through a first network; receive a path identifying a first set of network nodes that satisfy the circuit policy; configure each node in the first set of network nodes within the first network with the circuit policy; and establish a connection using the path that satisfies the circuit policy between the source node and the destination node, wherein a packet transmitted with the circuit policy includes addresses of at least a portion of the first set of network nodes in the packet.

In another example, an apparatus for configuring bidirectional co-routed network connections is provided. The apparatus includes: means for receiving a request for a circuit policy between a source node and a destination node, the circuit policy defining a co-routed bidirectional policy between the source node and the destination node; means for requesting a path compute service to identify a path between the source node and the destination node that satisfies the circuit policy through a first network; means for receiving a path identifying a first set of network nodes that satisfy the circuit policy; means for configuring each node in the first set of network nodes within the first network with the circuit policy; and means for establishing a connection using the path that satisfies the circuit policy between the source node and the destination node, wherein a packet transmitted with the circuit policy includes addresses of at least a portion of the first set of network nodes in the packet.

In some aspects, one or more of the methods, apparatuses, and computer-readable medium described above further comprise: determining a sub-policy (transit policy) for a network node of the first set of network nodes based on a capacity of another network node; and providing the sub-policy (transit policy) to the portion of the first set of network nodes.

In some aspects, an intermediary node between the source node and the destination node is configured to receive a packet traveling in either direction between the source node to the destination node and update the destination address in the packet based on a destination of the packet, the intermediary node being configured with the sub-policy (transit policy).

In some aspects, the intermediary node updates the destination address to include nodes in the path between the intermediary node and the destination of the packet based on a maximum stack depth of addresses within the destination address.

In some aspects, the destination address comprises a list of adjacency identifiers that identify a portion of the path.

In some aspects, each node in the first set of network nodes enforces each connection requirement in the circuit policy.

In some aspects, a controller service is configured to store bandwidth accounting for nodes within at least the first network, and wherein the controller service is configured to identify network nodes that can satisfy the circuit policy.

In some aspects, the path compute service or the controller service is configured to identify a co-routed bidirectional standby path between the source node and the destination node that satisfy the circuit policy.

In some aspects, one or more of the methods, apparatuses, and computer-readable medium described above further comprise: receiving a standby path including a second set of network nodes that satisfy the circuit policy.

In some aspects, one or more of the methods, apparatuses, and computer-readable medium described above further comprise: after receiving the working path, requesting a second network to retrieve the working path from the path compute service, wherein the working path includes network nodes within the second network; and configuring each node in the second set of network nodes within the second network with the circuit policy.

In some aspects, the source node and the destination node are synchronized and configured to monitor the working path and the standby path for network connection failures after the circuit policy is installed in the nodes of the first network and the second network.

In some aspects, one or more of the methods, apparatuses, and computer-readable medium described above further comprise: in response to detection of a network connection failure in the working path between the source node and the destination node, switching transmission of packets of the circuit policy to the standby path, wherein a destination address of the packets identifies at least a portion of the second set of network nodes.

In some aspects, the source node receives a forward segment list identifying the first set of network nodes from the source node to the destination node and a reverse segment list identifying the first set of network nodes from the destination node to the source node.

In some aspects, the source node and the destination node are configured to monitor the working path based on a loopback probe sent from the source node to the destination node and, in response to detecting a network connection failure based on failing to receive the loopback probe, iteratively send loopback probes to at least one node in the first set of network nodes to identify a location of the network connection failure.

In some aspects, one or more of the methods, apparatuses, and computer-readable medium described above further comprise: detecting a traffic volume from the source node to the destination node that exceeds a bandwidth requirement of the circuit policy; requesting the path compute service to identify a supplemental path between the source node and the destination node that satisfy the circuit policy through the first network; establishing a supplemental persistent connection using a supplemental working path; and configuring the source node and the destination node to perform load balancing based on a result provided by the path compute service.

In some aspects, one or more of the methods, apparatuses, and computer-readable medium described above further comprise: detecting a network connection failure in the working path or the supplemental working path; and in response to detection of the network connection failure in the working path or the supplemental working path, switching transmission of packets of the circuit policy to the standby path and a supplemental standby path.

In some aspects, the connection is persistent and does not change dynamically unless a network failure or the connection is reconfigured by a user.

In some examples, circuit-style SRv6 architecture systems and techniques described herein can be implemented to provide conventional connection-oriented services over SRv6 networks that can provide bidirectional SR circuit-style paths for connectivity and services. In some examples, circuit-style SR-MPLS architecture systems and techniques described herein can be implemented to provide conventional connection-oriented services over SR-MPLS that can provide bidirectional SR circuit-style paths for connectivity and services.

Conventional communications that use circuits (e.g., for carrying layer-2 data traffic such as ethernet data traffic as an example) and time-division multiplexing (TDM) are being replaced with packet switching networks (PSN). However, customers may have services that may be preferable for characteristics associated with circuit and TDM networks. In other words, customers may implement a PSN to fulfil the characteristics of the existing circuit and TDM networks.

In some examples, an SRv6 circuit-style (CS) architecture can replace conventional connection-oriented services over SRv6 and can provide bidirectional SR circuit-style paths for connectivity and services. In some examples, an SR-MPLS circuit-style (CS) architecture can replace conventional connection-oriented services over SR-MPLS and can provide bidirectional SR circuit-style paths for connectivity and services.

In some examples, an architecture is provided that allows the emulation of circuit networks over an SRv6 network (SRv6 Circuit Style). The architecture enables (1) co-routed bidirectional connections; (2) connection persistence; (3) guaranteed latency; (4) end-to-end path protection; and (5) guaranteed bandwidth. The SRv6 Circuit Style achieves these goals by introducing a new architecture that (1) introduces a network management system (NMS) to compute paths, to reserve bandwidth and to maintain connection configurations; (2) provides an explicit path that ensures independence from IP transport and control plane; and/or (3) provides a QoS configuration that guarantees bandwidth and latency end-to-end. In some examples, emulation of circuits network over an SR-MPLS network (SR-MPLS Circuit Style) is provided with similar architecture properties.

An example mechanism for enforcing the routes uses adjacency segment identifiers (SIDs) rather than a global SID (e.g., node SID). Adjacency SIDs identify the interface to use from a SID to the next node (e.g., the next SID) and direct the traffic to follow a specific path. To avoid the node on the path rerouting the traffic around failed node, unprotected adjacency SID is used to ensure the end-to-end latency and bandwidth guarantees. The path can be a bidirectional path. The NMS gets the network topology and bandwidth requirements for a circuit, installs policies on the routers for that circuit, and enforces the policies on the routers. Network traffic that is sent using this circuit can include a marker (e.g., EXP in SR-MPLS or DSCP in IP in some examples or some other field in a packet header) that identifies the network traffic for a circuit (and, in some cases, a relevant traffic policy and/or characteristic) to allow for accounting and to provide guaranteed treatments.

In some examples, command and control in this network topology is different than in conventional packet networks and includes different requirements. In conventional packet networks, traffic is rerouted around a failed node anywhere on the path using local fast-reroute techniques. However, this can cause additional latency and may not apply or provide bandwidth guarantees. In SR Circuit Style networks as described herein, if either the source or destination detects a failure, the failover can switch over to an end-to-end standby (e.g., backup or protect) path that is common (e.g., co-routed) for both send and receive (e.g., common in both directions).

The architecture described herein can provide bidirectional SR paths and can associate forward and reverse SR circuit policies and the underlying paths. The architecture can include multiple controllers that perform different functions. The NMS manages the circuits, and a device(s), such as an optimization engine (e.g., Cisco's optimization engine or any other engine) and/or a Path Computation Engine (PCE) can be used for SRv6 and SR-MPLS functions and computations.

SRv6 Circuit Style provides network services that can replace conventional connection-oriented services over SRv6 network. SRv6 Circuit Style allows bidirectional co-routed paths, guaranteed latency, guaranteed bandwidth, and end-to-end path protection with an SR network to replace legacy connection-oriented networks. Similarly, SR-MPLS Circuit Style provides network services that can replace conventional connection-oriented services over SR-MPLS network. SR-MPLS Circuit Style also allows bidirectional co-routed paths, guaranteed latency, guaranteed bandwidth, and end-to-end path protection with an SR network to replace legacy connection-oriented networks.

In some examples, the systems and techniques described herein can create an SR Circuit using a Network Management System (NMS).

In some examples, a method is disclosed for computing and creating an SR circuit-style (CS) path for multiple services. For example, the SR circuit-style path can be used by N services, so it can provide N:1 (services:path) mapping for greater scalability. The multiple services can be managed on top of each circuit-style (CS) SR Policy (e.g., for each SRv6 circuit-style path or each SR-MPLS circuit-style path). In some examples, NMS may be used in this case to perform connection admission control (CAC) functions to admit the circuits going over the SR Policy that may be based on the bandwidth requirement of the circuit. This method provides circuit-style SR Policy management and assurance. The SR circuit-style path can include an circuit SR Policy that defines bidirectional paths. The bidirectional paths may include co-routed forward and reverse direction paths.

Example Embodiments

SR is becoming increasingly popular for software defined networking (SDN) networks. SR is applicable to both Multiprotocol Label Switching (SR-MPLS) and IPv6 (SRv6) data planes. An SR network can use an SR Policy to steer traffic through the network. The SR Policy (SRv6 Policy or SR-MPLS Policy) provides a list of segments in an internet protocol (IP) header, that specifies a unidirectional path from a source node to a destination node in the network. SR Policy is an ordered list of segments (i.e., instructions) that represent a source-routed policy. The packets steered into an SR Policy carry an ordered list of segments associated with that SR Policy to reach the destination node. When a network node that corresponds to a segment in the list of segments receives a packet, the network node can process the SR header in hardware to determine the next network entity based on the list of segments and forward the packet to the next network node.

The present SRv6 technology encodes an explicit path containing a plurality of network apparatuses into a single IPv6 address that may allow a network apparatus to process SRv6 packets efficiently. SRv6 can also use a micro-segment identifier (µSID or uSID) or compressed SID (CSID), which encodes the explicit path in the SR header (SRH) and provides more efficient performance by ensuring that the packet is processed in the hardware and provide low Maximum Transfer Unit (MTU) overhead. The SR-MPLS encodes an explicit path containing a plurality of the network apparatuses into a stack of segments as MPLS labels.

FIG. 1 illustrates an example of a network 100 according to an example of the instant disclosure. A user, such as network administrator, can use a controller 105 to configure a control plane in a network and perform various control, administration, and management functions. For example, the controller 105 can configure various devices in the network 100 to implement an SR network 110. In other examples, the controller 105 may not be required and the network nodes can be SR-aware and not need configuration from the control plane. The controller 105 can be implemented by a computing device, such as computing system 1400 illustrated in FIG. 14. The SR network 110 is a segment routing network that includes nodes 120, 122, 124, 126, and 128. The number of nodes in FIG. 1 is merely illustrative. One of ordinary skill in the art will recognize from this disclosure that, in other examples, the SR network 110 can include more or less nodes than shown in FIG. 1. Each of these nodes can be, for example, a router, a switch, or another suitable node. The SR network 110 is generally a wired network but could be implanted in a wireless network (e.g., 802.11 variants such as 802.11ax, 802.11be, etc.), a cellular network (e.g., 4G, 5G, etc.), a combination of wired and wireless network, and/or can use any other suitable physical transmission medium. The SR network 110 can be used to provide a connection between user devices 102 and 104.

For example, user device 102 can transmit data to user device 104 using the SR network 110. The user device 102 is connected to the node 120, while the user device 104 is connected to the node 128. A user, such as a network administrator, can use the controller 105 to establish a path between the node 120 and the node 128. For example, the controller 105 can establish a path from the node 120 through the node 124 to the node 128. The controller 105 can install an SR Policy including this path. Traffic flowing from the user device 102 to the user device 104 is routed through this SR Policy.

Similarly, the controller 105 can establish a reverse-path from the node 128 to the node 120 of a bidirectional path. This path could include the node 128 to the node 126 to the node 124 to the node 120. The controller 105 can install a second SR Policy including this path. Traffic flowing from the user device 104 to the user device 102 is routed through this second SR Policy. In some example SR networks, the SR Policy from the node 120 to the node 128 is not associated with the reverse SR Policy from node 128 to node 120. A conventional SR Policy is unidirectional.

Figure 2:
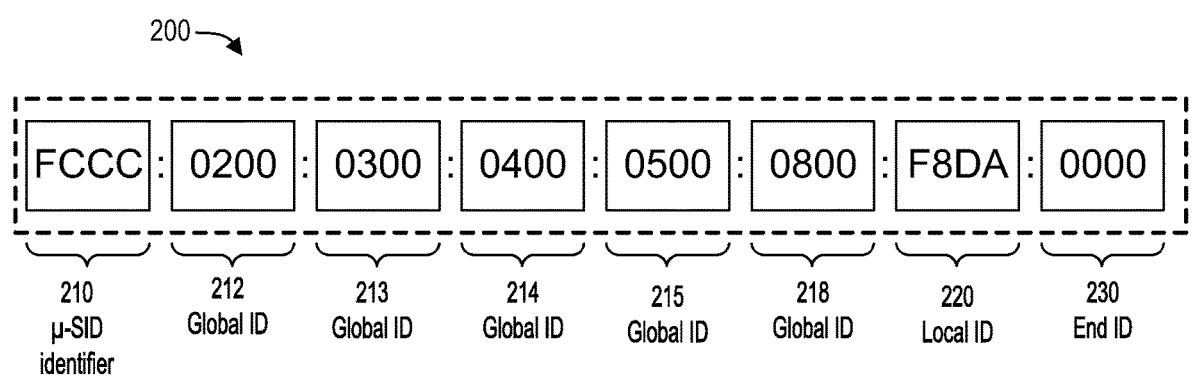
FIG. 2 illustrates an example of a micro-segment identifier (μSID) that can be used to address network nodes to route network traffic in an SR network according to an example of the instant disclosure.

FIG. 2 illustrates an example of a SRv6 µSID 200 that can be used to address network nodes to route network traffic in an SR network according to an example of the instant disclosure. The µSID 200 may include a µSID identifier block 210 in the destination address field of the IPv6 header that advertises that the address of the IP packet corresponds to a µSID. In some examples, FC/8 is available to any operator as a unique local address (ULA) space, any leading bit string that starts with FC may be used as a µSID identifier block 210 and an operator may use FCCC/16 as the µSID identifier block 210.

In some examples, a SRv6 µSID 200 may comprise one or more encoded identifiers. An encoded identifier may be a global identifier that may uniquely identify a network apparatus or node (e.g., a server, a virtual node, a software container, etc.) in a network domain. In some examples, a global identifier may be associated with one or more instructions. In some examples, an encoded identifier may be a local identifier. A local identifier may be associated with one or more instructions. A local identifier may uniquely identify one or more instructions within a network apparatus or node associated with the local identifier. The local identifier may be used for the purpose of control, management and administration of the CS SR Policy by the node. When a first network apparatus or node corresponds to a first global identifier and a second network apparatus or node corresponds to a second global identifier, a particularly encoded local identifier at the first network apparatus or node may correspond to instructions different to instructions corresponding to the particularly encoded local identifier at the second network apparatus or node. In some examples, a µSID may include an end identifier that indicates that the identifier preceding the end identifier in the µSID is a last encoded identifier.

The SRv6 µSID 200 illustrated in FIG. 2 comprises a µSID identifier block 210, global identifier 212, global identifier 213, global identifier 214, global identifier 215, global identifier 218, a local identifier 220, and an end identifier 230. In some examples, padding bits (not shown) are inserted after the end identifier 230. In some examples, additional addresses may be identified based on a local identifier that indicates that an SR header (SRH) includes additional addresses and instructions.

In some examples, a global identifier may comprise one or more predetermined bit sequences. A network apparatus or node may identify a global identifier based on the one or more predetermined bit sequences encoded in the global identifier. A local identifier may comprise one or more predetermined bit sequences. A network apparatus or node may identify a local identifier based on the one or more predetermined bit sequences encoded in the local identifier. As an example, illustrated in FIG. 2, a length of a global identifier is four nibbles (16 bits). The first nibble (four bits) of a global identifier may be zero. Thus, a network apparatus or node may determine that the global identifier 212 is a global identifier based on the first nibble of the global identifier 212 being zero. As another example, illustrated in FIG. 2, a length of a local identifier 220 is four nibbles (16 bits). The first nibble of the local identifier 220 may be "F" to indicate a local identifier. Although this disclosure describes a particular length of an encoded identifier, this disclosure contemplates any suitable length of an encoded identifier. Although this disclosure describes determining global identifiers and local identifiers in a particular manner, this disclosure contemplates determining global identifiers and local identifiers in any suitable manner.

In some examples, an end identifier 230 may comprise one or more predetermined bit sequences. A network apparatus or node may identify an end identifier based on the one or more predetermined bit sequences encoded in the local identifier. As illustrated in the example of FIG. 2, a length of an end identifier 230 is four nibbles (16 bits) and is encoded "0000" to indicate an end identifier. Although this disclosure describes a particular end identifier, this disclosure contemplates any suitable end identifier.

In some examples, the SRv6 µSID identifier block concatenated by a first global identifier may be a first address corresponding to a first network apparatus or node. The first network apparatus or node may advertise the first address within the network domain. Other network apparatuses or nodes within the network domain may update their corresponding forwarding tables upon receiving the advertised first address. When a packet with the first address arrives at a network apparatus or node, the network apparatus or node may forward the packet such that the packet is routed to the first network apparatus or node within the network domain.

Figure 3:
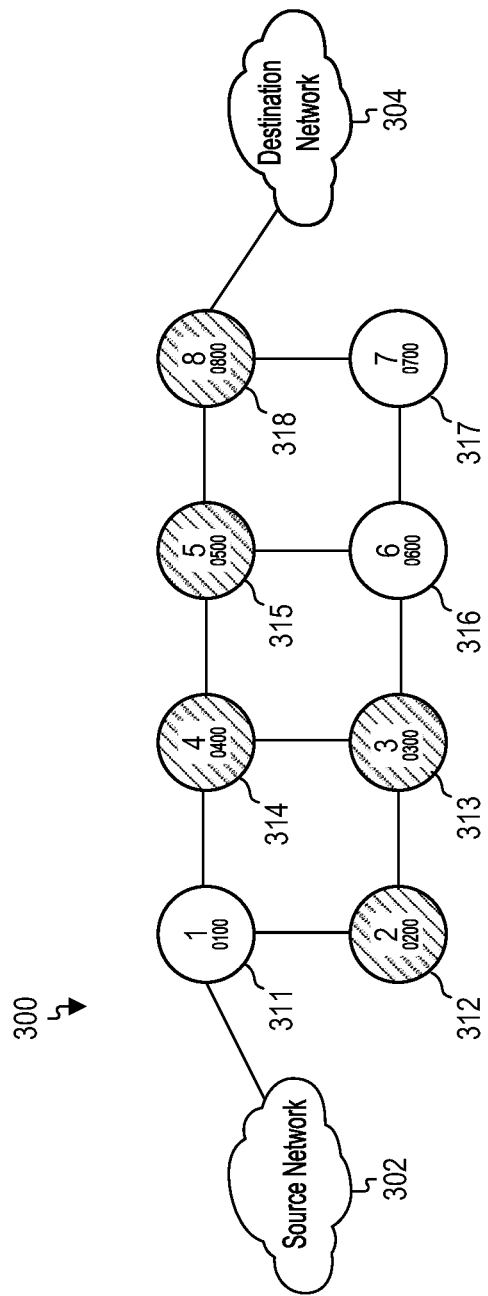
FIG. 3 illustrates an example packet forwarding based on a μSID according to an example of the instant disclosure.

FIG. 3 illustrates forwarding an example packet in an SRv6 network 300 from a source network 302 (or network node) to a destination network 304 (or network node) based on a µSID according to an example of the instant disclosure. The example network illustrated in FIG. 3 includes various network nodes configured to process SRv6 packets including a first network node 311, a second network node 312, a third network node 313, a fourth network node 314, a fifth network node 315, a sixth network node 316, a seventh network node 317, and an eighth network node 318. In this example, first network node 311 corresponds to µSID address "0100", second network node 312 corresponds to µSID address "0200", third network node 313 corresponds to µSID address "0300", fourth network node 314 corresponds to µSID address "0400", fifth network node 315 corresponds to µSID address "0500", sixth network node 316 corresponds to µSID address "0600", seventh network node 317 corresponds to µSID address "0700", and eighth network node 318 corresponds to µSID address "0800."

In some examples, a source network 302 may want to send a packet to a destination network 304 through a pre-determined forwarding path in the SRv6 network 300. The first network node 311 is an ingress (source) node for traffic from the source network 302 and the eighth network node 318 is an egress (destination) node for network traffic to the destination network 304. The first network node 311 receives a packet from the source network 302 and computes, or causes another network controller to compute, the route through the SRv6 network 300. In this example, the route to the destination network 304 is "FC00:0200:0300:0400:0500:0800:F8DA:0000" as identified in the µSID 200 including the second network node 312, the third network node 313, the fourth network node 314, the fifth network node 315 and the eighth network node 318. The first network node 311 also computes, or causes another network controller to compute, a packet treatment or functions that are performed locally (e.g., local processing) by network nodes during transit of the packet. The treatment of the packet can vary and can include, for example, (1) a slice identifier or a network resource partition identifier that applies a quality of service (QoS), (2) a path identifier for counting data packets to determine path packet loss, and/or (3) other functions further described below.

The first network node 311 encapsulates the packet in an IPv6 packet and includes the route to the destination network 304 in the destination address field of the header of the IPv6 packet. The first network node 311 can identify functions in the destination address to perform. In some examples, a portion of a prefix (e.g., 32 bits) of the µSID 200 is matched (e.g., "FCCC:0200/32") to identify a function to perform. For example, the first 16 bits ("FCCC") may be shifted to identify a next instruction ("0200"). In this case, the instruction may be an address encoded in the forwarding information base (FIB) to indicate a next hop for the packet.

The first network node 311 can identify functions in the destination address to perform. In some examples, a portion of a prefix (e.g., 32 bits) of the µSID 200 is matched (e.g., "FCCC:0200/32") to identify a function to perform. For example, the first 16 bits ("FCCC") may be shifted to identify a next instruction ("0200"). In this case, the instruction may be an address encoded in the forwarding information base (FIB) to indicate a next hop for the packet. In other examples, the instruction may be a type of function for that specific network node to perform. For example, an instruction may be to perform a deep packet inspection to read addresses in an SRH.

In some examples, the second network node 312 may receive a packet comprising a destination address including µSID 200. The destination address may comprise the µSID 200 concatenated by the second global identifier 212. The second network node 312 may determine that the second global identifier 212 corresponds to the second network node 312 and then may identify one or more instructions associated with the second global identifier 212 by looking up "FCCC:0200/32" in the FIB of the second network node 312 and determine that the instructions are to update the destination address in the destination field of the packet to an updated destination address. In response, the second network node 312 may update the address in the destination field of the packet to an updated destination address and then forward the packet to the updated destination address. For example, the second network node 312 may shift the bits after the µSID identifier block 210 by the length of the second global identifier 212 (e.g., 16 bits) to pop (e.g., remove) the address of the second global identifier 212 from the µSID 200. The second network node 312 may concatenate the remaining µSID identifier block 210 and the remaining addresses in the µSID 200. In that case, the 32 most significant bits in the µSID would be "FCCC:0300," which corresponds to the µSID identifier block 210 and the address of the third global identifier 213 associated with the third network node 313. The second network node 312 may perform a lookup of the next address in the destination address of the µSID 200 (e.g., "0300") in a forwarding table and transmit the packet to the third network node 313.

The third network node 313 performs the instructions identified in the μSID 200, which are similar to the instructions provided to the second network node 312 and causes the third network node 313 to update the destination address in the IP header and forward the packet to the next node associated with the fourth network node 314 based on the fourth global identifier 214 in the μSID 200. This process continues until the packet is received at eighth network node 318, which identifies that the next instruction in the μSID 200 is an end identifier 217. The eighth network node 318 de-encapsulates the packet and transmits the packet to the destination network 304.

Because the μSID 200 is within the destination address of an IP header, the μSID 200 can be processed in hardware (e.g., by an ASIC or FGPA) by network nodes 311-318 and each of the network nodes 311-318 can identify the destination in hardware without inspecting the packet. By processing the packets in hardware, each of the network nodes 311-318 can increase the number of packets processed to increase bandwidth while simultaneously reducing latency and jitter. Further, a local processing metadata can be included in the source address field and the hardware can be configured to identify and perform packet functionalities based on the local processing metadata.

In some aspects, the first network node 311 may be configured with a circuit SR Policy (also referred to as a circuit policy) that requires a minimum performance requirement that can achieve performance of conventional circuit networks. In this case, a controller (e.g., the controller 105) may be configured to perform network accounting functions to track each network node's allocated performance (e.g., bandwidth utilization), identify routes for circuit policies, and configure network nodes with the configurations associated with the circuit policies. The controller may be configured to determine a co-routed bidirectional path (or co-routed and bidirectional path) for the first network node 311. A co-routed bidirectional path refers to a route that follows a specific sequence of nodes and links that is identical in the forward direction (e.g., from the first network node 311 to the network node 318) and in the reverse direction (e.g., from the network node 318 to the first network node 311). The controller, using bandwidth accounting functions, may identify network nodes with sufficient unallocated performance to meet the requirements of the circuit policy. The controller ensures that each node in the route can meet a minimum performance level (e.g., end-to-end latency or packet loss or bandwidth guarantee, etc.).

In some aspects, the controller 105 may also configure the various nodes to monitor the path of the circuit policy and perform synchronously switch the route in the event of a failure in the path. To handle the switching from a working path or a standby (or a protect path), the controller 105 may also configure a standby route (or protect path or backup path) when determining the path.

Figure 4:
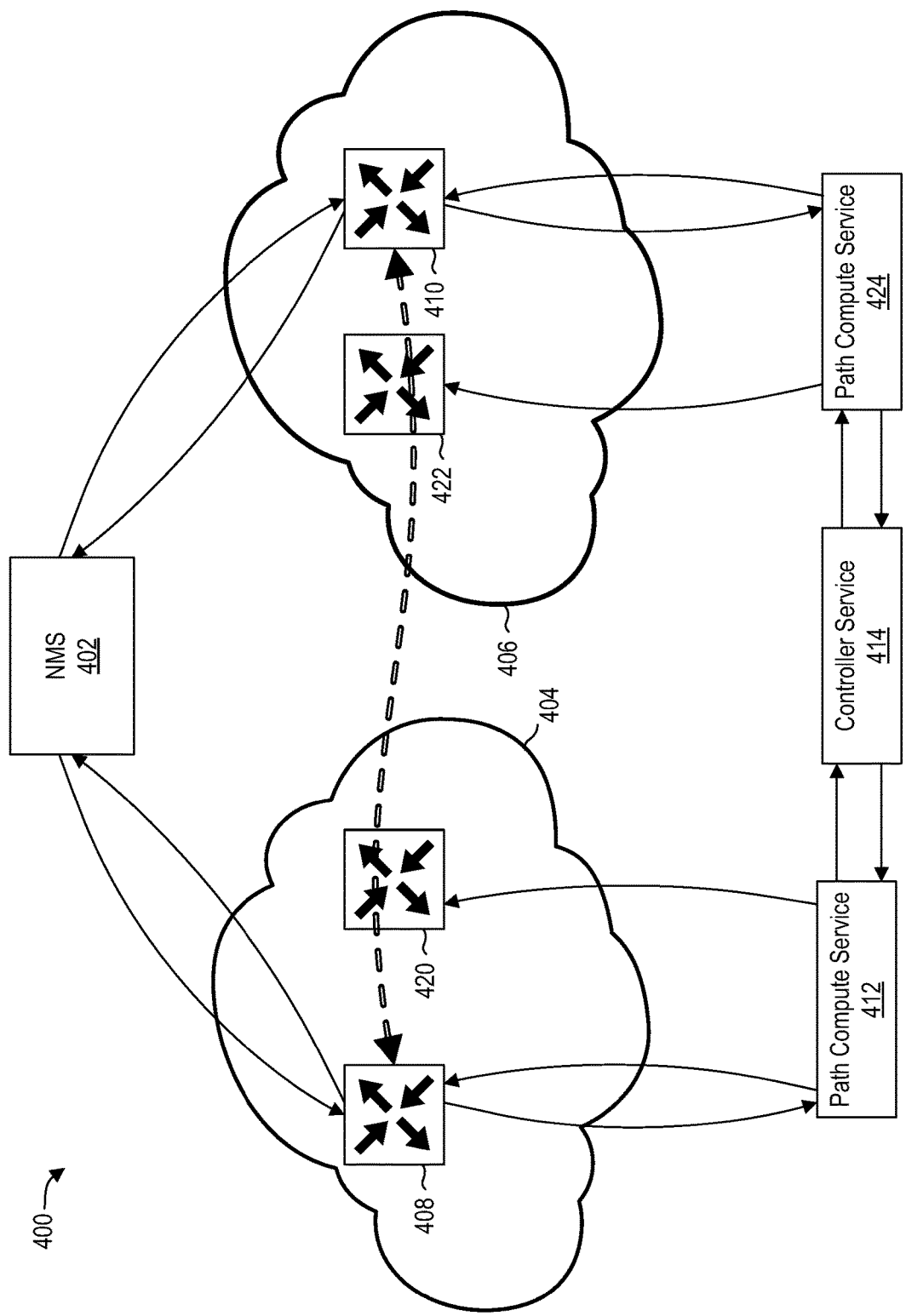
FIG. 4 illustrates an example of a circuit style network that implements a bidirectional co-routed connection according to some aspects of the disclosure.
Figure 5:
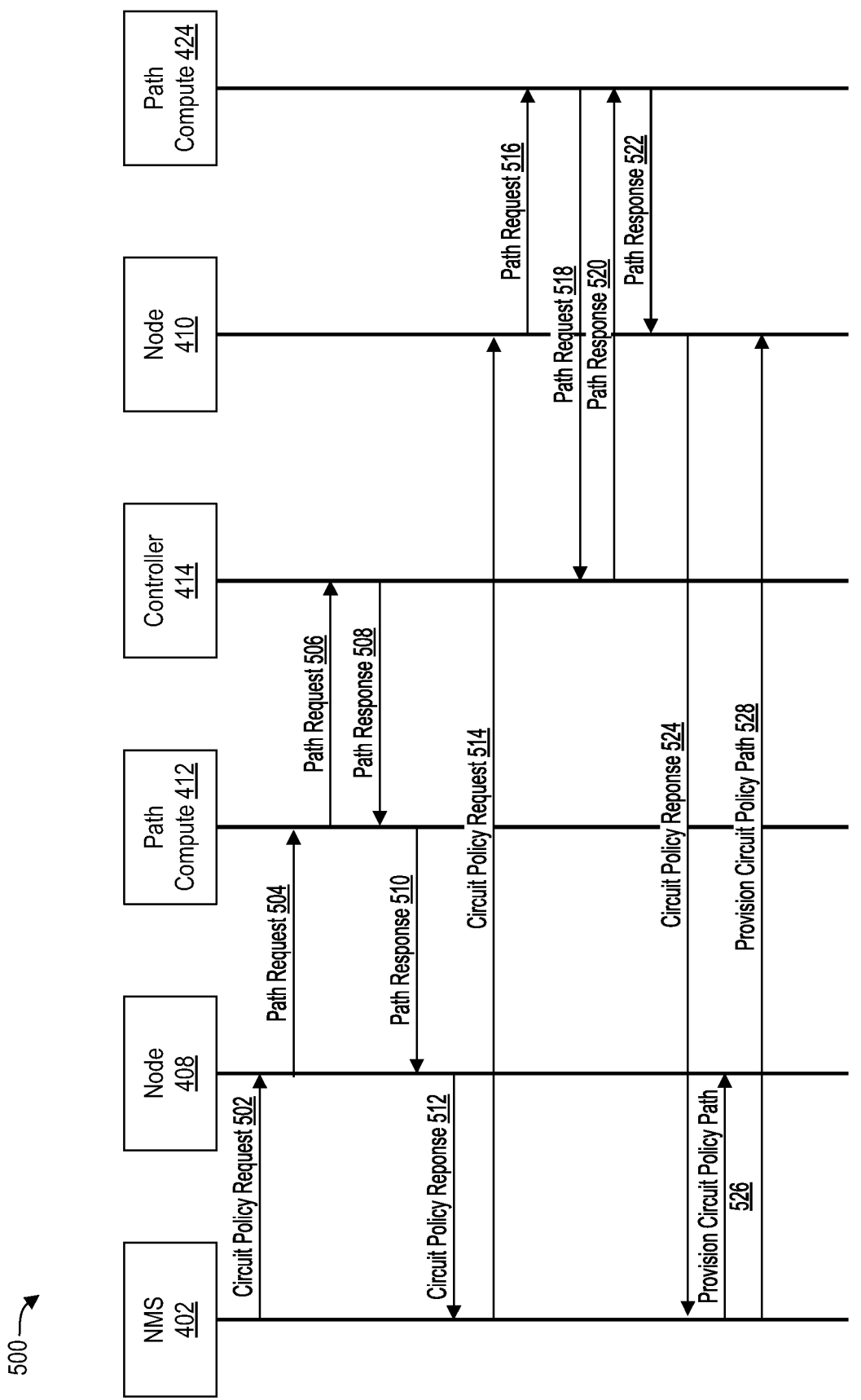
FIG. 5 illustrates a sequence diagram illustrating an example of a router-first workflow to implement a circuit style network.
Figure 6:
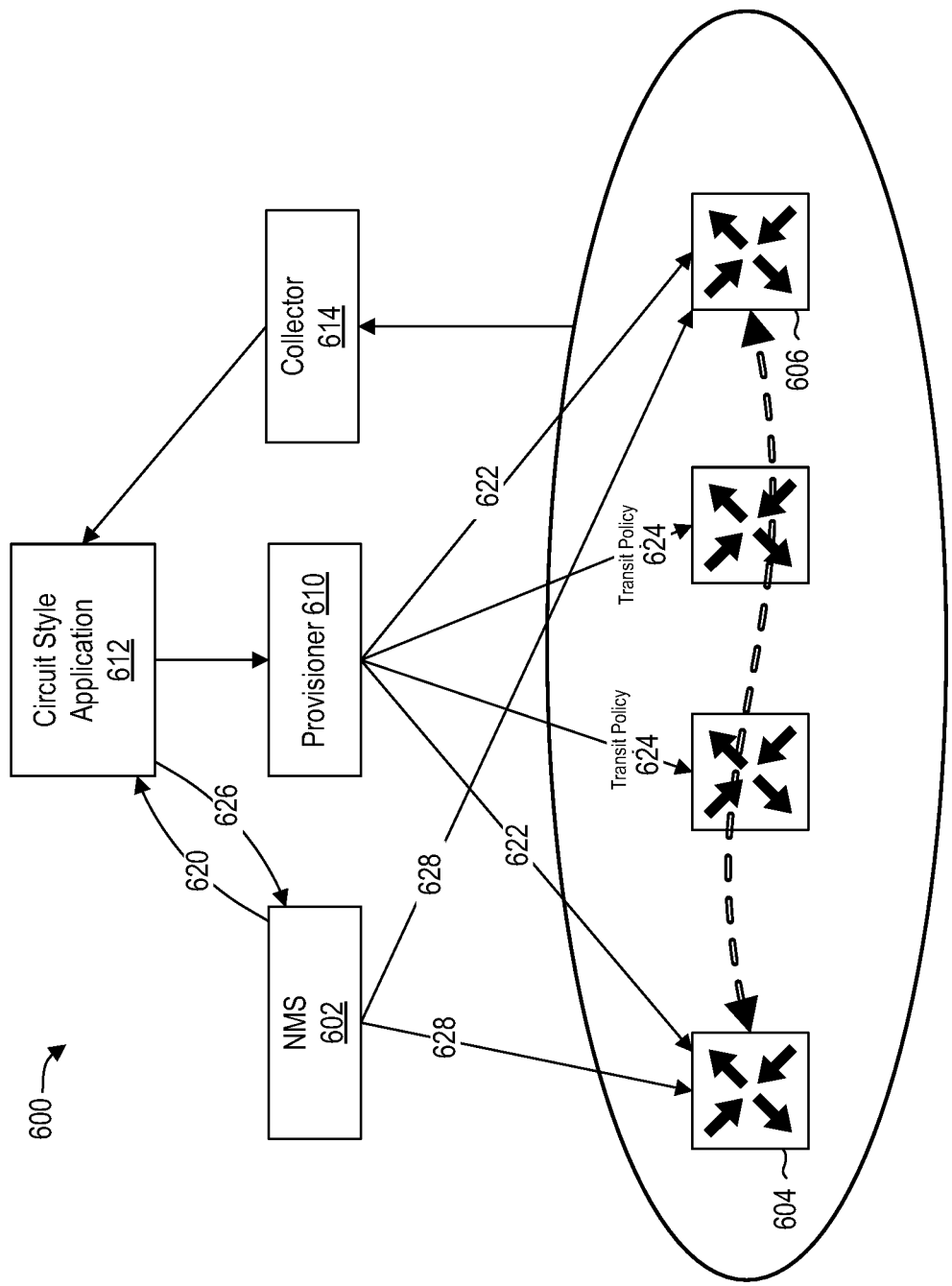
FIG. 6 illustrates an example of a circuit style network that implements a bidirectional co-routed connection using a controller-first workflow according to some aspects of the disclosure.
Figure 7:
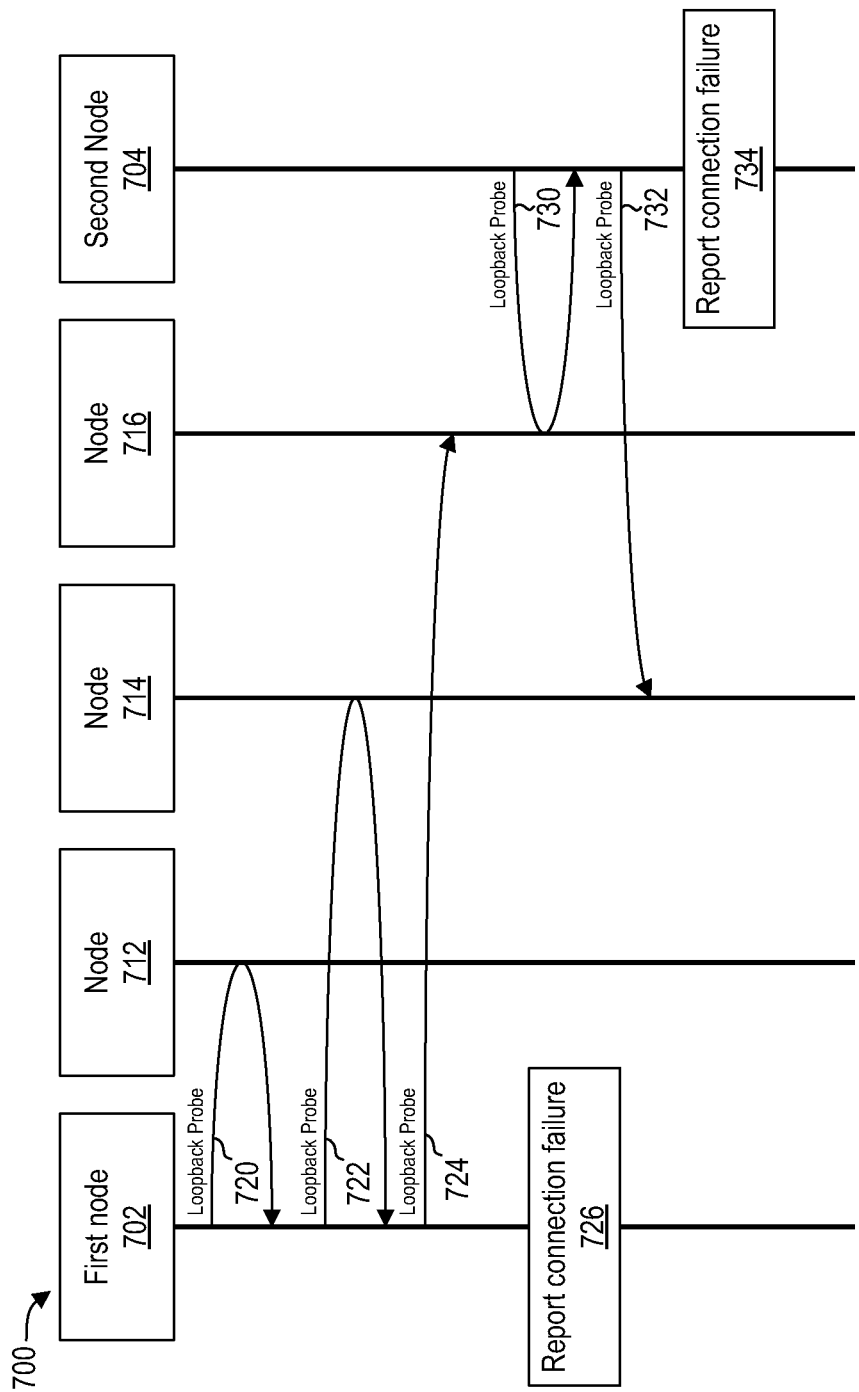
FIG. 7 illustrates a sequence diagram of a method for identifying a network connection issue in a circuit in accordance with some examples.
Figure 8:
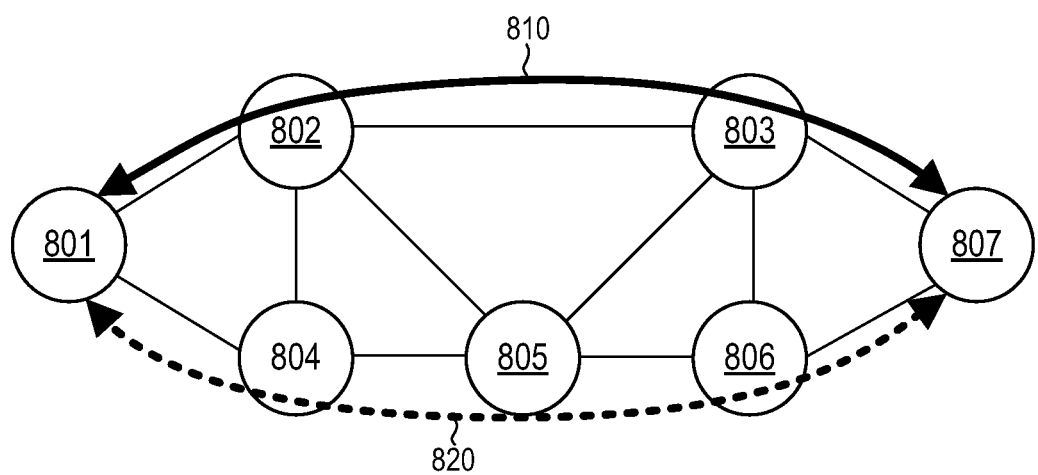
FIG. 8 illustrates example SR circuit-style working and standby (protect or backup) paths for bidirectional liveness monitoring and switchovers in accordance with some examples.

Further details of the circuit-style network are described in detail below, with FIG. 4 illustrating the allocation and management of the circuit-style network and FIG. 5 illustrating a sequence diagram of an example implementation of a configuration of a circuit-style network. FIG. 6 illustrates a sequence diagram of monitoring features of a circuit-style network, and FIG. 7 illustrates working route or working path and standby routes or standby paths. FIG. 8 illustrates an example of a circuit policy that allows an elephant flow, which is a large network traffic flow that exceeds an allocated bandwidth of a circuit policy, and FIG. 9 illustrates another example of the allocation and management of the circuit-style network.

FIG. 4 illustrates an example of a circuit-style network 400 that implements a bidirectional co-routed connection according to some aspects of the disclosure. Initially, an NMS 402 receives provisioning of a circuit policy to provide bandwidth accounting between a first network 404 and a second network 406. For example, the circuit policy may request a particular guaranteed bandwidth with a specific latency or jitter between a first node 408 of the first network 404 and a second node 410 in the second network 406.

In some aspects, the NMS 402 may be configured to invoke the implementation of the circuit policies by a router-first implementation or a controller-first implementation. FIG. 4 illustrates an example of a router-first implementation, and a controller-first implementation is illustrated herein with reference to FIG. 6. Various implementations may be possible and are within the scope of the instant disclosure. In the router-first implementation, the NMS 402 will request both the source node and the destination node to compute a path with an association identifier to identify the route or path. The association identifier may be identical for both the source node and the destination node to be able to bind the forward and reverse direction paths together.

In more detail of the router-first approach, the NMS 402 may receive a request for a service (e.g., a Layer-2 VPN service, for example) from a user. The NMS 402 may identify that a circuit-style configuration is needed for the VPN service. The request can include a circuit identifier that identifies the circuit policy. For example, the NMS 402 may create a new SR circuit entry if its local database with a circuit identifier (circuit ID) Cx that identifies destinations (e.g., first node 408 and second node 410), and include a transport profile, which includes co-routed reverse path, unprotected adjacency SIDs, and/or manual path update attributes, as described above. The request can include a reserved bandwidth for the pseudo-wire (PW) (X), and a requested bandwidth for the SR Policy (X'), with X'≥X reserved bandwidth. The NMS 402 may devise X', which X' being X for 1:1 PW to SR Policy mapping, and X'>X for N:1 PW to SR Policy mapping. The X' value is derived at the NMS, based on the expected usage of the SR Policy for future pseudo-wires.

The NMS 402 may create a new SR Policy on destinations first node 408 and second node 410 using the North Bound (NB) APIinterface by the network node (e.g., a node running Cisco's IOS-XR operating system providing GRPC APIs) with the following parameters: a destination node (e.g., node 410/node 408), X' Mbps reserved bandwidth, a circuit-style transport profile, maximum label-stack depth (MSD), a circuit association ID (the circuit association ID has to be same for the working LSP from node 408 to node 410 and from node 410 to node 408). The NMS 402 pushes all SR Policy configurations including path information to suitable nodes (e.g., source node and destination node for forward and reverse paths, respectively).

The SR-TE on source nodes (node 408 and node 410) delegate the candidate paths of the circuit-style SR Policy to their respective path computation service (e.g., path compute service 412 and path compute service 424). In some aspects, the SR-TE on source nodes associate an auto-generated name used in reporting each candidate path to controller service 414. This uses the symbolic name, which may include the configured name and preference identifier in some examples.

The first node 408 may transmit the request to a path compute service 412 to identify a path to the second node 410 based on an identifier of the circuit policy. For example, the SR-TE on source nodes (node 408 and node 410) delegate the candidate paths of the circuit-style SR Policy to their respective path computation service (e.g., path compute service 412 and path compute service 424). In some aspects, the SR-TE on source nodes associates an auto-generated name used in reporting each candidate path to controller service 414. This uses the symbolic name, which includes the configured name and preference in some examples. The path compute service 412 may also be referred to as a path computation element (PCE) or a PCE protocol (PCEP) controller.

The path compute service 412 may receive the request and identify if there is a previous circuit policy associated with the request and, if no previous circuit policy exists, the path compute service 412 may identify a potential route. In some aspects, the path compute service 412 may not be able to handle the bandwidth accounting associated with the circuit policy and will sub-delegate some of the path computations to a centralized controller service 414. The controller service 414 responds with a topology of the path to the path compute service 412, and the path compute service 412 then promulgates the computed path to the network nodes in the first network 404. In this case, the route from the network node 408 to the network node 410 includes an intermediary network node 420 and intermediary network node 422. For example, the SR-TE on source nodes 408 and 410 indicates to NMS 402 that the policy is operational. Event-driven telemetry and system logs are provided for NMS 402 notification. In some aspects, the SR Policies on node 408 and node 410 are brought up asynchronously. The NMS 402 is configured to monitor the SR policies in the nodes 408 and 410 and, when all policies are active, the NMS 402 provisions a connection (e.g., a pseudo-wire (PW) service) from node 408 to node 410.

The path compute service 412 may also create network sub-policies (transit policies) to handle network transmission functions and promulgate the sub-policies to any network node. For example, a list of SRv6 µSIDs that identifies a route may be greater than the 128-bits available in the destination address of an IPv6 packet, and a transit network node can be configured to insert additional µSIDs into the destination address. and this additional µSID can identify a path through a multiple devices that is popped only at the end network node associated with the transit policy. In this example, the additional µSID replaces the µSID for multiple devices and can reduce the size to less than or equal to 128-bits available in the destination address, which avoids processing of the SRH on the node. The transit network node can perform this function in hardware based on the network node configurations. In some other aspects, the address in a µSID can be a path identifier or a binding µSID that is processed and removed at the network node. In this illustrative example, each network node is configured to forward the packet with the path identifier µSID or binding µSID. Similarly, in case of SR-MPLS, a label stack that identifies a route may be greater that the MSD (Maximum Stack Depth) capability of the router to impose in MPLS header. Using a binding segment associated with the sub-policy (transit policy) on the network node configured by the controller, the stack size requirement is reduced to equal to or less that the MSD size of the MPLS header on the node.

Each network node in the first network 404 (e.g., first node 408 and intermediary network node 420) receives configuration information to implement the circuit policy and the first network node 408 may report back to the NMS 402 indicating that the policy has been created. The NMS 402 can also send that circuit policy to the second network node 410 which also requests a path for the circuit policy from a path compute service 424, which further provides the request to the controller service 414. When the controller service 414 receives the request, the controller service 414 previously computed the path and then transmits that computed path to the path compute service 412, which then installs the policies in the network nodes associated with the second network 406. In some cases, once the policies are installed in each network node, the NMS 402 may determine that each network node for the path is configured with the necessary configuration and may transmit a message to the first network node 408 and the second network node 410 to activate the circuit policy.

FIG. 5 illustrates a sequence diagram 500 illustrating an example of a router-first workflow to implement a circuit-style network. Initially, the NMS 402 can receive information to promulgate a circuit policy and transmit a circuit policy request 502 to the first network node 408. The first node 408 can receive the circuit policy request 502 and send a path request 504 to the path compute service 412, which includes the circuit identifier. The path compute service 412 can compute part of the path but may send a path request 506 to request the centralized controller service 414 to compute a part of the path or all of the path due to the bandwidth accounting features. The centralized controller service 414 can identify if the circuit policy has been previously configured and determine if a path using that circuit policy is valid. If the circuit policy exists and is valid, the centralized controller service 414 can provide that path to the path compute service 412 in a path response 510. The path provided by the centralized controller service 414 can also include a standby path (or protect path) that is used in the event of a connection issue within the path. If the circuit policy does not exist, the centralized controller service 414 can use the information provided from the path compute service 412, which may include a partial path, a list of potential network nodes, etc., and compute a path from the first node 408 to the second node 410. The centralized controller service 414 provides the path corresponding to the circuit identifier in the path response 508.

The path compute service 412 may receive the path response 510 and promulgate the path identified in the path response 510 to corresponding nodes. As further described above, the path compute service 412 may also identify sub-policies associated with the circuit policy and promulgate those sub-policies to at least one network node in the first network 406. The node 408 receives the path response 510 and may install the policy, and transmit a circuit policy response 512 to the NMS 402.

The NMS 402 may also transmit a circuit policy request 514 to the second node 410. Although the sequence diagram illustrates that the circuit policy request 502 and circuit policy request 512 may be transmitted later in time, the requests can be provided at any particular time (e.g., before the circuit policy response 512, after the circuit policy response 512, at the same time as the circuit policy request 502, etc.). The node 410 may transmit a path request 516 to the path compute service 424, which transmits a path request 518 to the centralized controller service 414 and receives a path response 520. In some aspects, the centralized controller service 414 may have already computed the path (e.g., using the path request 506), and can return the previously computed path in a path response 520 to the path compute service 424, which provides a path response 522 to the second node 410. The second node 410 may provide a circuit policy response 524 to the NMS 402 indicating that the policy has been installed in corresponding nodes.

The NMS 402 may provision a circuit policy 526 to the first node 408 and a circuit policy 528 to the second node 410 to activate the circuit-style network connection between the first node 408 and the second node 410. After the circuit-style network connection, the first node 408 and the second node 410 are tasked with monitoring the working path and a standby path to ensure continuous service in both directions. In some aspects, the first node 408 receives a forward stack of MPLS labels that identify a path from the first node 408 to the second node 410 using techniques described above and a reverse stack of MPLS labels that identify a reverse-path from the second node 410 to first node 408. The second node 410 receives a forward stack of MPLS labels that identify a path from the second node 410 to the first node 408 using techniques described above and a reverse stack of MPLS labels that identify a reverse-path from the first node 408 to second node 410.

The nodes can use the forward path and reverse path to verify path integrity to ensure that the co-routed bidirectional path is functional. In some cases, a loopback probe (such as TWAMP/STAMP (Simple Two-way Active Measurement Protocol packets) can be used by the first node 408 and the second node 410 to ensure that the loopback travels to each node in the forward direction and then each node in the reverse direction of the co-routed bidirectional path. In the event that the loopback probe does not return, or does not complete the expected route, the originating first node 408 or the second node 410 can detect an issue with the circuit-style network connection.

FIG. 6 illustrates an example of a circuit style network 600 that implements a bidirectional co-routed connection using a controller-first workflow according to some aspects of the disclosure.

In the controller-centric workflow shown in FIG. 6, the provisioning for the circuit style path is performed from a centralized location (e.g., the NMS 602). When a customer provides a request to the NMS for a service from node 604 to node 606, the NMS requests information for the circuit style path connection/provisioning from a circuit style application 612 (or circuit style manager) at reference numeral 620. The request can specify the connectivity requested by the customer from node 604 to node 606, as well as any requirements for the service. The circuit-style application 612 provisions (configures/updates/uploads, etc.) (e.g., via a provisioner 610) anything it needs from the transport network at reference numeral 622. If there is a need to install sub-policies (e.g., transit policies), the circuit style application 612 installs sub-policies (e.g., transit policies) at reference numeral 624. For the provisioning at reference numerals 622 and 624, the circuit style application 612 can use information obtained from a collector 614, such as topology information, QoS information, etc. The collector 614 can determine the information based on, for example, telemetry data, SNMP, etc., and other data collected from the network.

The circuit-style application 612 then returns the circuit style path (e.g., the transport connection information) to the NMS 602 at reference numeral 626, which the NMS 602 uses to setup the transport connection at reference numeral 628. The circuit-style service is installed at nodes to use that transport connection. The circuit-style path can be used by any number of services, so the circuit-style path provides a many-to-one mapping for scalability.

The compute and setup of an SR circuit-style path can be used for multiple pseudo-wire services. The SR circuit-style path can be used by any number of services, so it can provide N:1 (services:path) mapping for greater scalability. This provides an end-to-end circuit-style SR-TE as an IP/MPLS transport technology that mimics TDM/Optical behavior and SLA by managing bandwidth (BW) reservation and utilization end-to-end based on PCE (COE) and SR-TE (XR) foundations. The SR circuit-style path can be used for multiple pseudo-wire services, and can provide N:1 (services:path) mapping for greater scalability.

FIG. 7 illustrates a sequence diagram 700 of a method for identifying a network connection issue in a circuit in accordance with some examples. Although the sequence diagram illustrates a sequence over time, the sequence diagram 700 is illustrative and various other sequences can be used to implement the disclosed method.

In the event that a circuit style is configured between a first node 702 and a second node 704, both the first node 702 and the second node 704 can identify a network connection error based on using the loopback probes described above. To isolate the source of the network connection failure, the first node 702 and the second node 704 can send loopback probes (such as TWAMP/STAMP (Simple Two-way Active Measurement Protocol packets) to each node in their forward direction. For example, the forward direction of the first node 702 includes node 712, node 714, and node 716, and the forward direction of the second node 704 includes node 716, node 714, and node 712. In some aspects, the first node 702 may send loopback probes to each node. In one illustrative example, the first node 702 may send a first loopback probe 720 to the node 712, which returns the loopback probe 720 to the first node 702. The first node 702 therefore determines that the network connection between the first node 702 and the node 712 is operations. The first node 702 may then send a loopback probe 722 to the node 714, which also returns the loopback probe 722. After determining that the network connection between the node 712 and node 714 is operational, the first node provides a loopback probe 724 to the node 716, which is not returned. The first node 702 thereafter reports a connection failure 726.

The second node 704 can also perform a similar operation by providing a loopback probe 730 to the node 716, which is returned to the second node. When the second node 704 provides a loopback probe 732 to the second node 714, the loopback probe 732 is not returned and the second node 704 can report a connection failure. Based on the identified connection failures, a network entity can determine that the network connection fails between the node 714 and the node 716 at block 734.

FIG. 8 illustrates example SR circuit-style working and standby paths for bidirectional liveness monitoring and switchovers in accordance with some examples. In the example illustrated in FIG. 8, an NMS (e.g., NMS 402, NMS 602, etc.) can setup a working path 810 that uses SR circuit-style provisioning and a standby path 820 (e.g., protect) that uses SR circuit-style path provisioning between nodes 801 and 807. In some cases, the working path 810 can have a failure that is unidirectional. If there is a failure that is unidirectional, node 807 may stop receiving traffic while the other nodes (e.g., node 801) may still be able to receive traffic. When node 807 stops receiving traffic, the node 807 (or controller or other device) may initiate a switchover to a standby path 820. A switch to the standby path may not always be desirable because traffic should be co-routed as much as possible to ensure that the forward and reverse paths can have a same path and allow bidirectional connectivity. Accordingly, FIG. 8 illustrates that both nodes 801 and 807 independently switch to the standby path 820 when there is a unidirectional failure or a bidirectional failure in the working path 810. This allows both the nodes to perform bidirectional liveness monitoring on the working path 810 and the standby path 820 to verify connectivity and perform fast and consistent switchovers when there is any network connection failure.

The NMS can provide node 801 and node 807 the forward and reverse links (segment list (SID list)) of the working path 810 (e.g., {forwardPath: [node 802, node 803, node 807], reversePath: [node 803, node 802, node 801]}) as well as the forward and reverse links of the standby path 820. In some cases, node 801 and node 807 can each use the forward and reverse links to send loopback probes (such as TWAMP/STAMP (Simple Two-way Active Measurement Protocol packets) to verify that both directions on a path are working and detect any unidirectional failures independently. When node 801 or node 807 detects a failure on the working path 810, node 801 and node 807 perform a switchover to the standby path 820. The standby path 820 is co-routed bidirectional and is based on a SR circuit-style path policy including forward and reverse segment lists (SID lists).

FIG. 9 illustrates an example environment for managing elephant flows in a circuit-style network configuration, in accordance with some examples. An elephant flow is a network traffic flow that exceeds a minimum guarantee of the circuit policy and/or exceeds a certain bandwidth size. For example, if the circuit guarantees 70 GB of bandwidth and there is 100 GB of traffic, there is 30 GB of excess network traffic that may not be able to be accomodated on working path 910 that uses an SR circuit-configuration between node 904 and node 906, and a standby path 920 (e.g., a protect path) that uses an SR circuit-style configuration between the node 904 and node 906.

For elephant flows, if the network does not have an SR circuit-style path with required bandwidth that can handle the elephant flows, the controller service 930 can create an additional working SR circuit-style path and promulgate the paths to the paths compute services 932 and 934, which can install a supplemental working path 940 and a supplemental standby path 950 that the nodes can use for independent, seamless switchover in case of insufficient bandwidth or a unidirectional or bidirectional failure. In some examples, the working path 910 and supplemental working path 940 are protected by the standby path 920 and the supplemental standby path 950 as long as bandwidth requirements are met by both sets for the elepahant flow. In some caes, the number of circuit-style paths in each set may or may not be the same. Node 904 and node 906 can perform bidirectional liveness monitoring on working paths 910 and 940 and standby paths 920 and 950 to verify connectivity and perform fast and consistent switchovers. The liveness monitoring for working paths may be enabled to run at much faster detection interval than the standby paths to optimize the hardware resources. The liveness monitoring of the working paths may be offloaded to run on hardware offload engines for faster detection interval whereas the liveness monitoring of the standby paths may be performed by the control plane. The node 904 and node 906 can obtain, from the NMS, forward and reverse links (an SR list) for each path, and use the forward and reverse links to send loopback probes (such as TWAMP/STAMP (Simple Two-way Active Measurement Protocol packets) to verify that both directions on a path are working. Each SR segment list can include a loopback (forward and reverse links) path for each node (node 904 and node 906).

Each working path and standby path of each candidate path can include an SR list with reverse and forward links for bidirectional connectivity. If there is a failure, the node 904 and node 906 can switch from the working path 910 to the standby path 920 to maintain co-routed bidirectional traffic on the same path. In the event of a single failure, for example in the working path 910, both the working path 910 and the supplemental working path 940 are switched to the standby path 920 and the supplemental standby path 950 to guarantee bandwidth for example. In some cases, the liveness monitoring in loopback mode on two endpoints of the SR Policy follow the same path in the forward and reverse directions. Hence, any failure on the forward or reverse direction paths of a bidirectional SR Policy will trigger the protection switchover on both endpoints at about the same detection intervals to ensure co-routedness of the bidirectional traffic In some examples, the method detects failures in the forward and reverse paths of a SR circuit-style bidirectional path, performs seamless switchovers in response to failures, and handles elephant flows when an existing path does not have sufficient bandwidth. The switchovers and deployment of SR circuit policies can involve deploying/switching over both working and standby paths to ensure traffic is always carried on the same path. Rather than switching a working path or a standby path, both the working and standby paths of a candidate path in an circuit policy are switched to other working and standby paths.

In some examples, the systems and techniques described herein can provide segment routing circuit-style path bidirectional fault localization.

SR circuit-style paths may be generated for bidirectional communications using segment routing. An SR circuit-style path that can be used for multiple services. For example, the SR circuit-style path can be used by n services, so it can provide n:1 (services:path) mapping for greater scalability. The multiple services can be managed on top of each circuit-style (circuit-style) SR Policy (each SRv6 circuit-style path or each SR-MPLS circuit-style path). In some examples, the systems and techniques described herein of a process for performing bidirectional liveness monitoring of working and standby (protect) SR circuit-style paths and localizing faults along bidirectional SR circuit-style paths using loopback probes (such as TWAMP/STAMP (Simple Two-way Active Measurement Protocol packets).

Figure 10A:
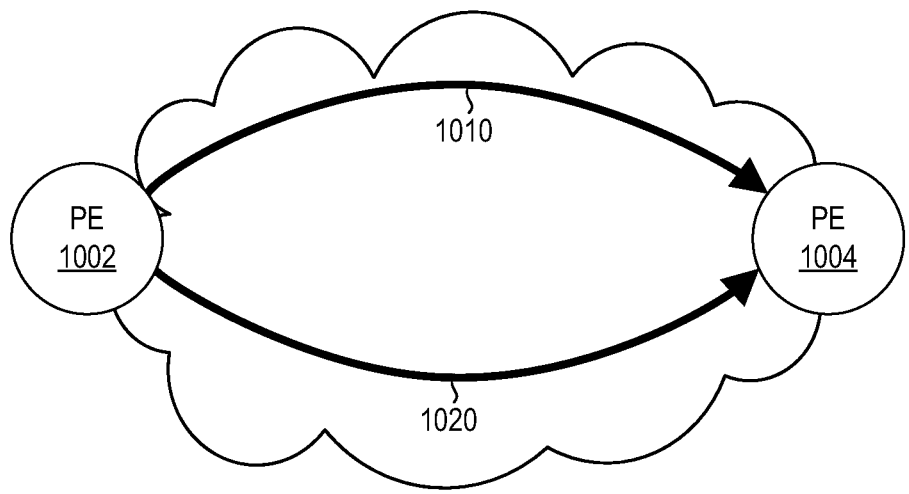
FIGS. 10A-C illustrates various examples of elephant flows and various options for routing traffic during network events in accordance with some examples.
Figure 10B:
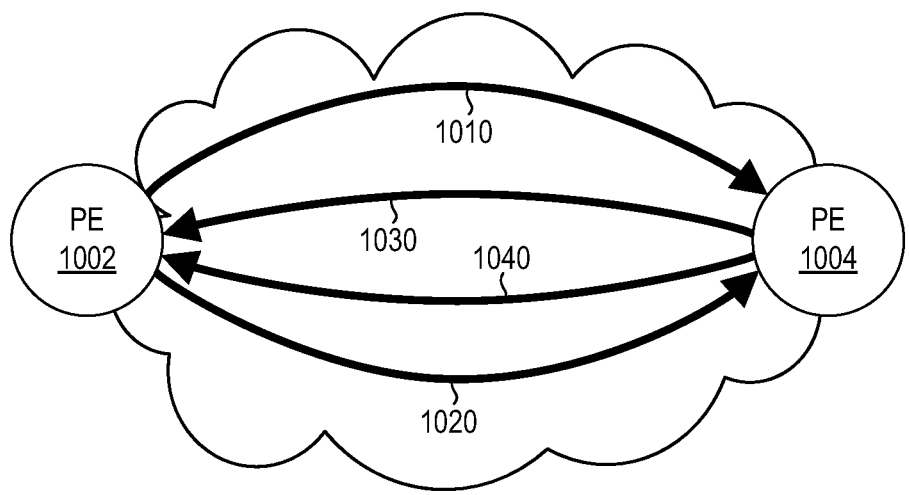
Figure 10C:
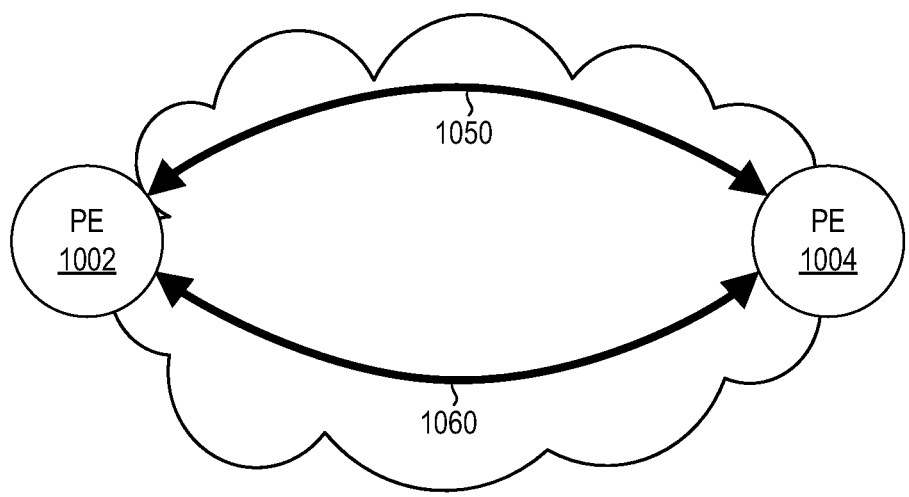

FIGS. 10A-C illustrates various examples of elephant flow and various options for routing traffic during network events. In the example illustrated in FIG. 10A, a total 100 GB of traffic goes into the SR Policy from a provider edge (PE) 1002 to a PE 1004, and 70 GB of that traffic is transmitted through working path 1010 and 30 GB is transmitted through supplemental working path 1020. In some cases, it is required that each working forward path to be associated with the corresponding working reverse path for co-routed bidirectional traffic.

FIG. 10B illustrates an example in which signaling is used to associate forward and reverse SR Policies and their underlying paths, including supplemental forward and reverse direction paths 1020 and 1040, respectively. The association of the forward and reverse policies and the underlying paths can provide a consistent picture and allows for different applications including circuit-style network. This may be done by building on top of the PCEP signaling mechanism. Example applications can include co-routed forward and reverse paths, and each path on PE 1002 gets a forward as well as the reverse path, which can be used for OAM verification mechanisms where the source node (e.g., PE 1002) needs to know not just the forward segment list but also the reverse segment list (e.g., PCE path description) for each path. For example, sending a packet on the forward path and have a loopback on the same set of links and nodes back to the sender, for delay measurements, for liveness monitoring and for packet loss measurement, OAM, Bidirectional Forwarding Detection (BFD), etc. purposes.

In some cases, the PATH-ATTRIB object of the PCEP carry an "R" flag to signify that the given path is a "Reverse" path and also carry a TLV (with Explicit Route Object ERO Segment List) that ties the forward and reverse paths. Table 1 illustrates conventional signaling for the PATH-ATTRIB object, and Table 2 illustrates proposed signaling to identify the reverse segment list.

TABLE 1

<PATH-ATTRIB Path_ID=1 <WEIGHT-TLV Weight=<32-bit>>
    <ERO1>
<PATH-ATTRIB Path_ID=2 <WEIGHT-TLV Weight=<32-bit>>
    <ERO2>

TABLE 2

<PATH-ATTRIB Path ID=1 R=0 <REV-PATH-TLV Reverse ID=3>
<WEIGHT-TLV Weight=<32-bit>>
    <ERO1>
<PATH-ATTRIB Path ID=2 R=0 <REV-PATH-TLV Reverse ID=4>
<WEIGHT-TLV Weight=<32-bit>>
    <ERO2>
<PATH-ATTRIB Path_ID=3 R=1 <REV-PATH-TLV Reverse_ID=2>
<PATH-SEGMENT 1>>
    <ERO3>
<PATH-ATTRIB Path_ID=4 R=1 <REV-PATH-TLV Reverse_ID=2>
<PATH-SEGMENT2>>
    <ERO4>

The above signaling associates reverse and forward paths and can indicate that a particular path is a reverse of a forward path, and vice versa. One illustrative example includes per-path loopback measurement of delay/loss and liveness monitoring The defined signaling provide information for the source nodes (e.g., PE 1002, PE 1004) to know to exact reverse path for each forward path of the SR Policy. In this case, the Performance Measurement (PM) can trigger failure per-path. The source nodes (e.g., PE 1002, PE 1004) can associate received traffic on a given path with the forward path using the path identifier segment in the received packet The association of the forward and reverse policies and the underlying paths can provide a consistent picture and allows for different applications such as co-routed forward and reverse paths, providing each path a forward and reverse path, which can be used for OAM applications and verification mechanisms where the source node needs to know not just the forward segment list but also the reverse segment list (e.g., a PCE path description).

In some aspects, FIG. 10B illustrates that the forward paths 1010 and 1020 are not co-routed with the reverse paths 1030 and 1040 (e.g., forward and reverse direction traffic takes different paths) that can result in traffic for a circuit flowing on asymmetric paths in two directions. FIG. 10C illustrates that the paths 1050 and 1060 are both co-routed in accordance with circuit policies.

Figure 11:
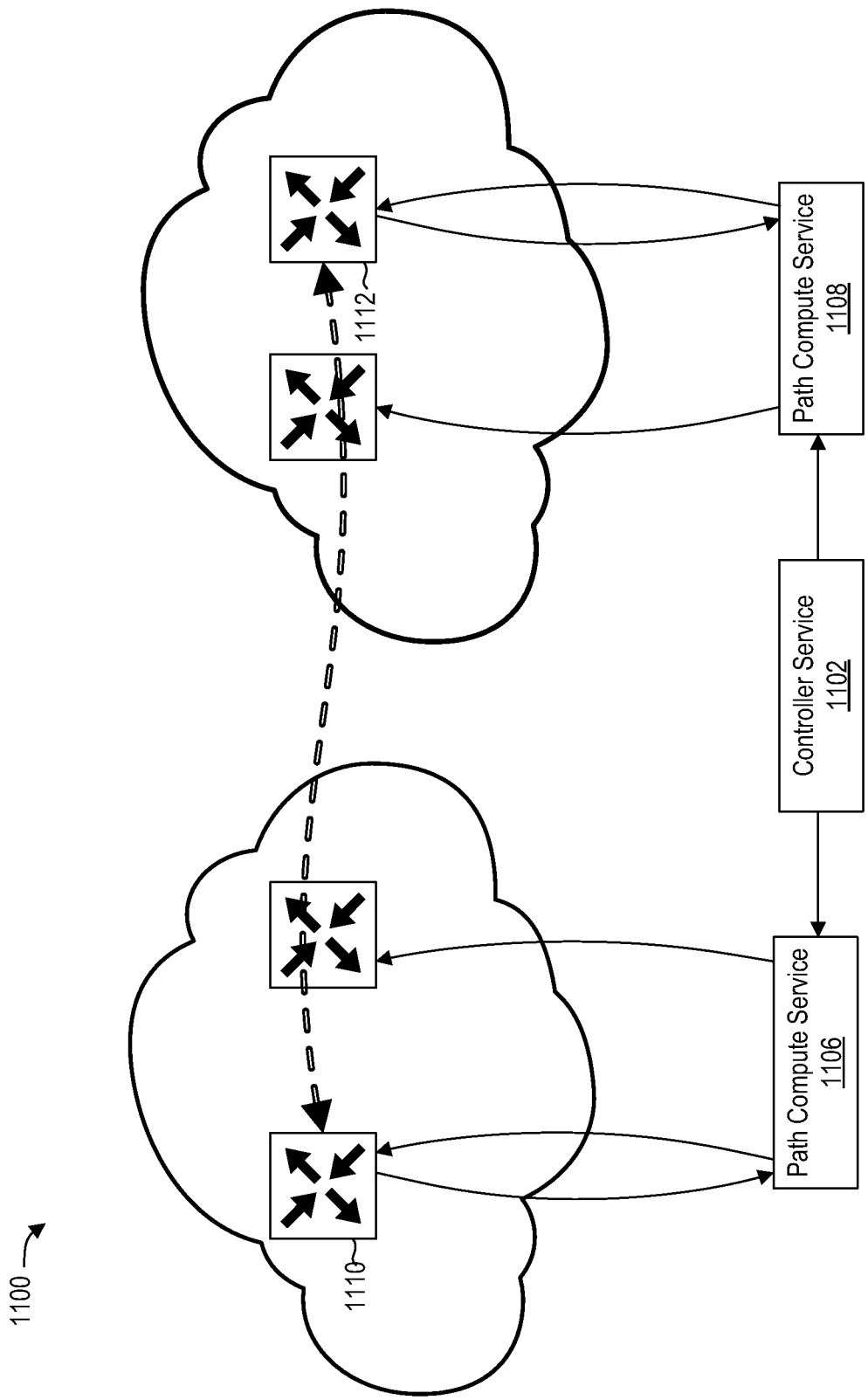
FIG. 11 illustrates an example workflow of optimization of a circuit-style connection in accordance with some examples.

FIG. 11 illustrates an example workflow of optimization of a circuit-style connection in accordance with some examples. In some examples, a user can use a user interface to improve SR paths in circuit-style network configurations in an example network 1100. In general, the SR circuit-style paths will not be changed dynamically, but a customer will be able to migrate to a new optimized path using a controller service 1102 (e.g., Cisco Optima Engine (COE)). A workflow to migrate the paths can be implemented that allows persistent connections to coexist while migrating a connection from a first node 1110 to a second node 1112.

In some examples, the controller 1102 computes the new paths (including adjacency SIDs) and policies and sends the new paths to the nodes. However, when calculating the path, controller service 1102 reserves bandwidth on the new path that is common to the old path because traffic is either on the new path or old path (and avoid double booking the bandwidth in the network). The path compute services 1106 and 1108 (e.g., PCEs) may also search for tunnels between nodes in the path computation to increase processing capabilities.

There are two types of switchover: simultaneous switchover, and sequential switchover. In the simultaneous switchover, in some examples, the new working and standby paths are brought online. If either path fails to be created, then switchover stops. When both working and standby paths are active, migration from the old path to the new path begins. In sequential switchover, in some examples, the new working path is created and traffic is routed to the new working path. The new standby path is then created and traffic is routed to the new standby path. In the event any new path is not created, the migration fails and the existing connections are maintained.

In some aspects, simultaneous switchover guarantees no traffic loss but at a cost of increased complexity. In sequential switchover, traffic may be lost, but it is an option because it simplifies the switchover process.

The circuit policy feature is defined for transport-minded customers that do not like the paths to change (e.g., optical transport networks (OTN)) dynamically (i.e. persistence paths). Consequently, the re-optimization is a rare event in the network and may occur when a customer finds enough grooming or change of traffic pattern/topology that justifies moving circuit-style persistence policies. Customers may be presented with the re-optimized paths and may have an opportunity to commit to confirm re-optimization via the controller service 1102.

As the re-optimization event can require presence of re-optimization path for both working and standby paths, the re-optimization event can have an impact on the SR Policy. For example, the network node can carry simultaneous paths (e.g., working, re-optimization for working, standby and re-optimization for standby) for the duration of re-optimization. Therefore, triggering re-optimization of many circuit policies at the same time should be avoided. Re-optimization may be done in a paced fashion in the network to alleviate the load and churn For example, consider the case of a re-optimization of circuit policy $C_X$, and circuit policy $C_X$ refers to the associated uni-directional SR policies from the first node 1110 to the second node 1112 and the second node 1112 to the first node 1110, collectively. Circuit policy $C_X$ is associated on the first node 1110 with a SR Policy $POL_X$, a protection identifier Y and the pair of protected candidate paths (CPs) ($W_Y$, $P_Y$), and the second node 1102 is associated with SR Policy $POL_{X'}$, protection identifier Y' and the pair of protected CPs ($W_{Y'}$, $P_{Y'}$). In this example, the traffic is originally flowing from the first node 1110 to the second node 1112 on path $W_Y$, and from the second node 1112 to the first node 1110 on path $W_{Y'}$.

Initially, a user requests the preview of re-optimization of circuit policy $C_X$ through a user interface associated with the controller service 1102. The controller service 1102 computes a new pair of protected paths ($W_{Y+1}$, $P_{Y+1}$) from the first node 1110 to the second node 1112 and ($W_{Y'+1}$, $P_{Y'+1}$) from the second node 1112 to the first node 1110. The potential set of paths (along with their attributes) are presented to the user. The User has an option to commit to re-optimization or abort it.

If the user commits to re-optimization, the controller service 1102 increments the protection identifiers to Y+1 and Y'+1. If necessary, the controller service 1102 instructs the path compute services 1106 and 1108 to create new sub-policies (transit policies) on intermediate routers. In some cases, existing sub-policies (transit policies) may not be modified to avoid any transient issue on the existing SR circuit policy The controller service 1102 instructs path compute service 1106 to update the working path to $W_{Y+1}$ with protection identifier Y'+1 and to update the standby path to $P_{Y+1}$ with protection identifier Y+1. The controller service 1102 instructs path compute service 1108 to update the working path to $W_{Y'+1}$ with protection identifier Y'+1 and to update the standby path to $P_{Y'+1}$ with protection identifier Y'+1.

In some aspects, the path compute services 1106 and 1108 send an update message to their corresponding network nodes to update the identifiers of the circuit connections (e.g., [{path=$W_{Y+1}$, protection ID=Y+1, standby flag=0}, {path=$P_{Y+1}$, protection ID=Y+1, standby flag=1}] for node 1110, and [{path=$W_{Y'+1}$, protection ID=Y'+1, standby flag=0}, {path=$P_{Y'+1}$, protection ID=Y'+1, standby flag=1}] for node 1112).

The first node 1110 creates a new LSP object for path $W_{Y+1}$ and sends a report to path compute service 1106. The first node 1110 also installs path $W_{Y+1}$ in Forwarding Information Base (FIB) alongside path $W_Y$ and initializes a new PM liveness session for $W_{Y+1}$. The router handles the path update in a make-before-break (MBB) fashion. The first node 1110 creates a new LSP object for path $P_{Y+1}$ and sends a report to path compute service 1106. The first node 1110 also installs path $P_{Y+1}$ in the standby (backup) FIB entry for $W_{Y+1}$ and initializes a new PM liveness session for $P_{Y+1}$.

The second node 1112 creates a new LSP object for $W_{Y'+1}$ and sends a report to PCE. The second node 1112 also installs path $W_{Y'+1}$ in FIB alongside path $W_{Y'}$ and initializes a new PM liveness session for $W_{Y'+1}$. The second node 1112 creates a new LSP object for $P_{Y'+1}$ and sends a report to PCE. The second node 1112 also installs path $P_{Y'+1}$ in the standby (backup) FIB entry for $W_{Y'+1}$ and initializes a new PM liveness session for $P_{Y'+1}$.

Once the PM liveness sessions for both paths (e.g., $W_{Y+1}$ and $P_{Y+1}$) are up, the first node 1110 performs a lossless traffic switchover from $W_Y$ to $W_{Y+1}$ and sends reports for $W_{Y+1}$ and $P_{Y+1}$ identifying, $W_{Y+1}$ as the new working LSP and $P_{Y+1}$ as the new standby (protect) LSP. The first node 1110 deletes $W_Y$ and $P_Y$ and sends the "removal" reports for them to path compute service 1106.

When the PM liveness sessions for both paths ($W_{Y'+1}$ and $P_{Y'+1}$) are up, the second node 1112 performs a lossless traffic switchover from $W_{Y'}$ to $W_{Y'+1}$ and sends reports for $W_{Y'+1}$ and $P_{Y'+1}$ identifying, $W_{Y'+1}$ as the new working LSP and $P_{Y'+1}$ as the new standby (protect) LSP. The second node 1112 deletes $W_{Y'}$ and $P_{Y'}$ and sends the "removal" reports for them to path compute service 1108.

In some aspects, the path computation client (PCC) running on a node will notify "state" of each LSP W_y, P_y, W_Y+1, P_Y+1 to PCE as it completes the re-optimization (e.g., via PCEP) and the PCC will notify that W_Y+1, P_Y+1 are active. PCE will notify controller service 1102 of these state changes (via North Bound (NB) API). These messages are the same for re-optimizing controller service 1102 instantiated SR Polices. The controller service 1102 requests unused old sub-policies (transit policies) to be deleted.

In some cases, different failures can be resolved in different manners. The different failure scenarios are described below. When the PM liveness session does not come up (timeout expires), the first node 1110 or the second node 1112 can activate a bring-up timer (may be hardcoded to 3 minutes; may not be configurable as an example). When the bring-up timer expires, the controller service 1102 aborts the re-optimization.

When the path update failed in both directions, either the controller service 1102 has not received a PCEP success report from either source node (e.g., node 1110, node 1112) after some time (timeout) or it has received an explicit PCEP failure report from both source nodes. The controller service 1102 does not need to reply ($W_Y$, $P_Y$). The controller service 1102 requests unused sub-policies (transit policies) associated with ($W_{Y+1}$, $P_{Y+1}$) and ($W_{Y'+1}$, $P_{Y'+1}$) to be deleted and notifies the operator of the failure.

When the path update succeeded in one direction and failed in the other, either the controller service 1102 has not received a path computation element protocol (PCEP) success report from one source node after some time (timeout) or it has received an explicit PCEP failure report. This case is unlikely given the bidirectional liveness monitoring. The controller service 1102 requests node 1110 to revert to ($W_Y$, $P_Y$) with protection identifier Y+2, requests the second node 1112 to revert to ($W_{Y'}$, $P_{Y'}$) with protection identifier Y'+2, requests unused sub-policies (transit policies) associated with ($W_{Y+1}$, $P_{Y+1}$) and ($W_{Y'+1}$, $P_{Y'+1}$) to be deleted, and notifies the operator the failure.

Another option for re-optimizing the working (primary) and standby (backup) candidate paths, independently is being considered. In this case, the circuit is unprotected when work path W and standby path P are using different pairs of protected paths.

In some cases, the workflow for one LSP re-optimization is the same as described for joint re-optimization for working or standby (protect) LSP. However, each LSP is reoptimized one-by-one. RFC8745 can be leveraged to resolve the issue.

In both options, if re-optimization fails for either working (primary) or standby (backup) candidate paths, SR Policy reverts back to the old paths. Per LSP re-optimization is easier to design and may be selected during the design phase.

Figure 12:
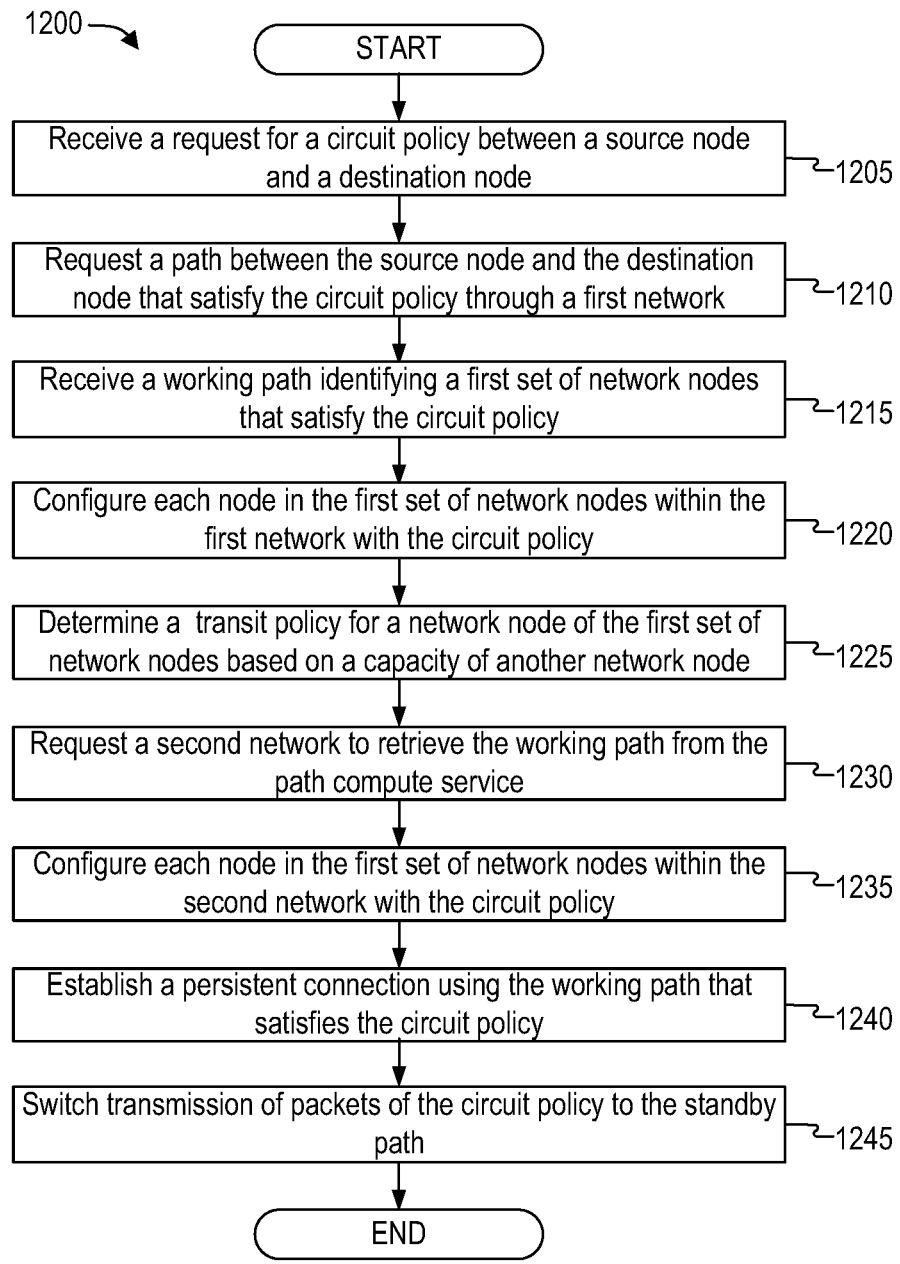
FIG. 12 illustrates a flowchart of an example method for implementing a circuit-style network in accordance with some examples.

FIG. 12 illustrates an example method 1200 for forming a circuit-style network. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

The method is performed using various nodes of the network that compose a network system. In some cases, some of the functions can be delegated to other components, some nodes can be combined into a single entity, and some functions can be optionally omitted.

According to some examples, the method 1200 includes receiving a request for a circuit policy between a source node and a destination node at block 1205. For example, the NMS 402 may receive a request for a circuit policy between a source node and a destination node. The circuit policy defining a co-routed bidirectional policy between the source node and the destination node.

According to some examples, the method 1200 includes requesting a path compute service to identify a path between the source node and the destination node that satisfy the circuit policy through a first network at block 1210. For example, the NMS 402 can transmit a policy request (for the circuit policy) to router 408 and the router 408 may request a path compute service 412 (that is capable of computing paths using various algorithms including CSPF, affinity, TE/IGP/latency/loss metrics, diversity, SRLG, flex-algorithm, etc. as examples) to identify a path between the source node (e.g., router 408) and the destination node (e.g., route 410) that satisfy the circuit policy through a first network. In some cases, a bandwidth accounting may need to be provided and the path compute service 412 can delegate some or all of the computation to the controller service 414. The path compute service or the controller service is configured to identify a standby path between the source node and the destination node that satisfies the circuit policy. A controller service is configured to store bandwidth accounting for nodes within at least the first network, and identify network nodes that can satisfy the circuit policy.

In some aspects, the source node receives a forward segment list identifying the first set of network nodes from the source node to the destination node and a reverse segment list identifying the first set of network nodes from the destination node to the source node.

According to some examples, the method 1200 includes receiving a working path identifying a first set of network nodes that satisfy the circuit policy at block 1215. For example, the routers 408, 410, 422, and 422 may receive a working path identifying a first set of network nodes that satisfy the circuit policy. The routers 408, 410, 422, and 422 may also receive a standby path in the event of network failures.

According to some examples, the method 1200 includes configuring (e.g., by the routers 408, 410, 422, and 422) each node in the first set of network nodes within the first network with the circuit policy at block 1220. Each node in the first set of network nodes enforces each connection requirement in the circuit policy.

According to some examples, the method 1200 includes determining a sub-policy (transit policy) for a network node of the first set of network nodes based on a capacity (such as maximum number of segment processing capability) of another network node at block 1225. For example, the path compute service 412 may determine a sub-policy (transit policy) for a network node of the first set of network nodes based on a capacity (such as maximum number of segment processing capability) of another network node. As described above, the IPv6 destination address comprises a list of adjacency identifiers that identify a portion of the working path. Because the IPv6 destination address has limited space, a function can replace a portion of the IPv6 destination address and the function identifies a known sequence of In some cases, an intermediary node configured with the sub-policy (transit policy) is configured to receive a packet traveling in either direction between the source node to the destination node and update the IPv6 destination address in the packet based on a destination of the packet. The intermediary node updates the IPv6 destination address to include nodes in the working path between the intermediary node and the destination of the packet based on a maximum uSIDs within the IPv6 destination address. In some examples, for SR-MPLS, this is capability of the node for the maximum label stack depth imposition and processing.

According to some examples, the method 1200 includes requesting a second network to retrieve the working path from the path compute service at block 1230. For example, the NMS 402 may request a network node 410 to retrieve the working path from the path compute service 424. The path compute service may delegate a portion of the computation to the controller service 414, which responds with the working and standby path that was previously computed. Because both the router 410 and the router 412 receive a request with the same identifier, the controller service 414 ensures the correct path is received for each network.

According to some examples, the method 1200 includes configuring each node within the second network with the circuit policy at block 1235. The source node receives a forward segment list identifying the first set of network nodes from the source node to the destination node and a reverse segment list identifying the first set of network nodes from the destination node to the source node.

According to some examples, the method 1200 includes establishing a persistent connection using the working path that satisfies the circuit policy between the source node (e.g., router 408) and the destination node (e.g. router 410) at block 1240. A packet transmitted with the circuit policy includes addresses of at least a portion of the first set of network nodes in a destination address of the packet (e.g., in some cases, the forward segment list of μSID segments may exceed the destination address field size). In some aspects, the source node and the destination node are synchronized and configured to monitor the working path and the standby path for network connection failures after the circuit policy is installed in the nodes of the first network and the second network. For example, the source node and the destination node are configured to monitor the working path based on a loopback probe (such as TWAMP/STAMP (Simple Two-way Active Measurement Protocol packets) sent from the source node to the destination node and, when a loopback is not returned, each of the source node and destination node may iteratively send loopback probes to network nodes. This allows the identification of a network connection failure.

According to some examples, in response to detecting a network failure, the method 1200 includes switching transmission of packets of the circuit policy to the standby path at block 1245.

Figure 13:
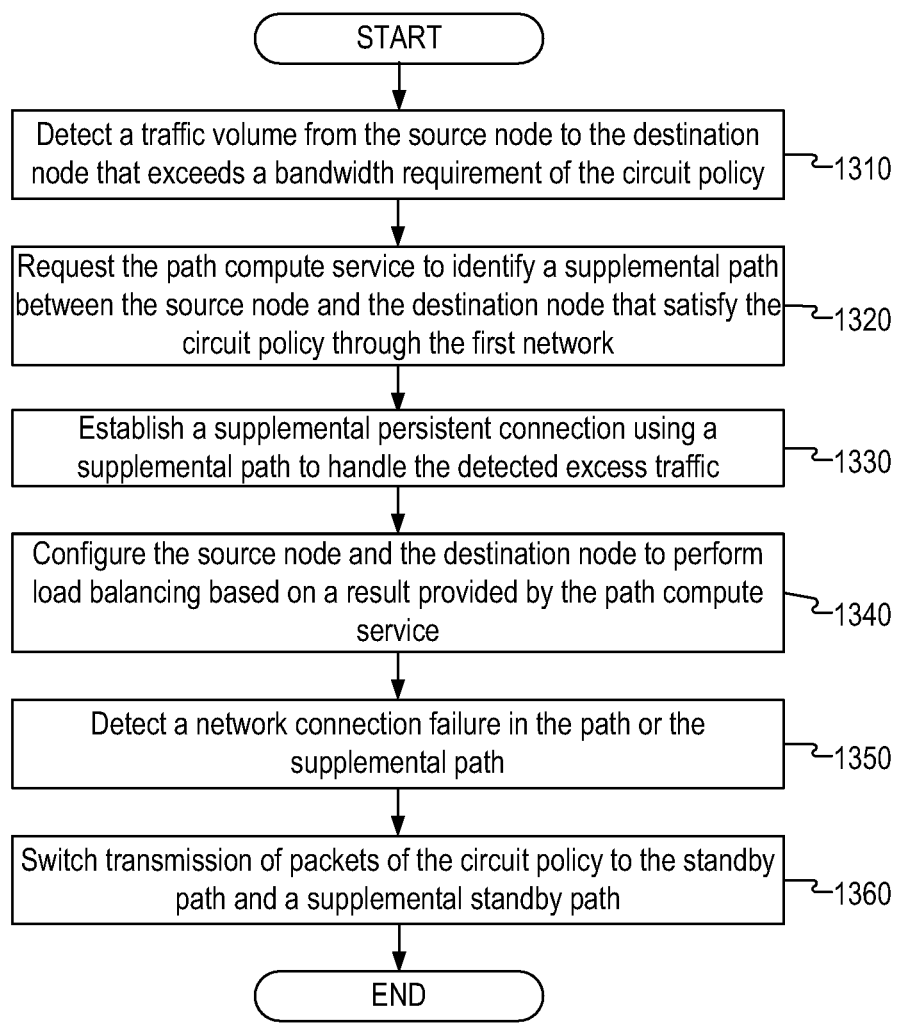
FIG. 13 illustrates an example method for configuring a supplemental circuit-style connection in the event of a network flow that exceeds the circuit policy in accordance with some examples.

FIG. 13 illustrates an example method 1300 for configuring a supplemental circuit-style connection (working path or standby path) in the event of a network traffic flow that exceeds the circuit policy bandwidth reservation. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

According to some examples, the method 1300 includes detecting a traffic volume from the source node to the destination node that exceeds a bandwidth requirement of the circuit policy at block 1310. For example, the router 408 or router 410 may detect a traffic volume that exceeds a bandwidth requirement of the circuit policy.

According to some examples, the method 1300 includes requesting the path compute service to identify a supplemental path between the source node and the destination node that satisfies the circuit policy through the first network at block 1320. According to some examples, the method 1300 includes establishing a supplemental persistent connection using a supplemental working path at block 1330. For example, the controller 414 can compute a supplemental path through a network and promulgate that path into nodes of the various networks to establish a supplemental persistent working path.

According to some examples, the method 1300 includes configuring (e.g., by the path compute service 412 and 424) the source node and the destination node to perform load balancing of traffic based on a result provided by the path compute service at block 1340. For example, the router 408 and router 410 may be configured to determine how to separate traffic through the working path and the supplemental working path. The path compute service or the controller service may provide these policies, or the policies can be dictated based on a combination of the controller service, routers, and NMS.

According to some examples, the method 1300 includes detecting a network connection failure in the working path or the supplemental working path at block 1350. After detecting the connection failure, the method 1300 includes switching transmission of packets of the circuit policy to the standby path and a supplemental standby path at block 1360.

Figure 14:
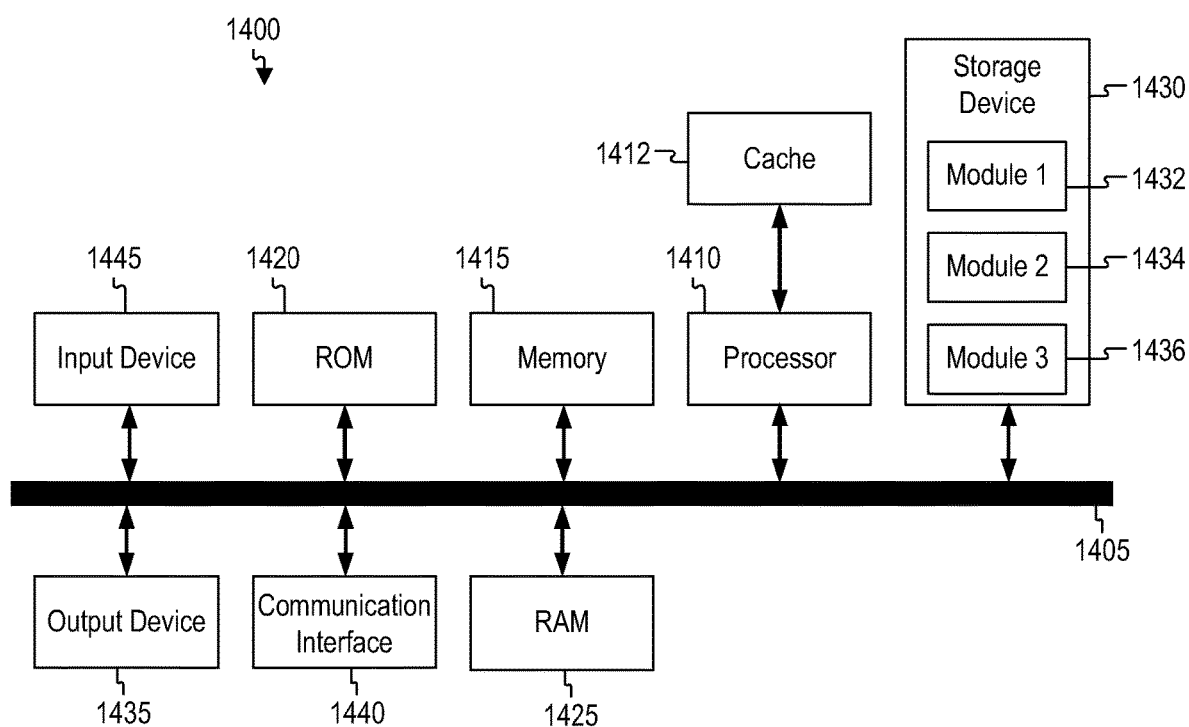
FIG. 14 shows an example of a computing system, which can be for example any computing device that can implement components of the system.

FIG. 14 shows an example of computing system 1400, which can be for example any computing device making up any network node such as the NMS 402, the various network nodes (e.g., network nodes 408, 410, 420, and 422), path compute service 412 and 424, and controller service 414, or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments computing system 1400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 1400 includes at least one processing unit (CPU or processor) 1410 and connection 1405 that couples various system components including system memory 1415, such as read only memory (ROM) 1420 and random access memory (RAM) 1425 to processor 1410. Computing system 1400 can include a cache of high-speed memory 1412 connected directly with, in close proximity to, or integrated as part of processor 1410.

Processor 1410 can include any general-purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement and therefore the basic features here may easily be substituted for improved hardware or firmware arrangements as they are developed.

Storage device 1430 can be a non-volatile memory device and can be a hard disk or other types of computer readable media which can store data that are accessible by a computer, such as magnetic cassettes, flash memory cards, solid state memory devices, digital versatile disks, cartridges, RAMs, ROMs, and/or some combination of these devices.

The storage device 1430 can include software services, servers, services, etc., that, when the code that defines such software is executed by the processor 1410, causes the system to perform a function. In some embodiments, a hardware service that performs a particular function can include the software component stored in a computer-readable medium in connection with the necessary hardware components, such as processor 1410, connection 1405, output device 1435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 15:
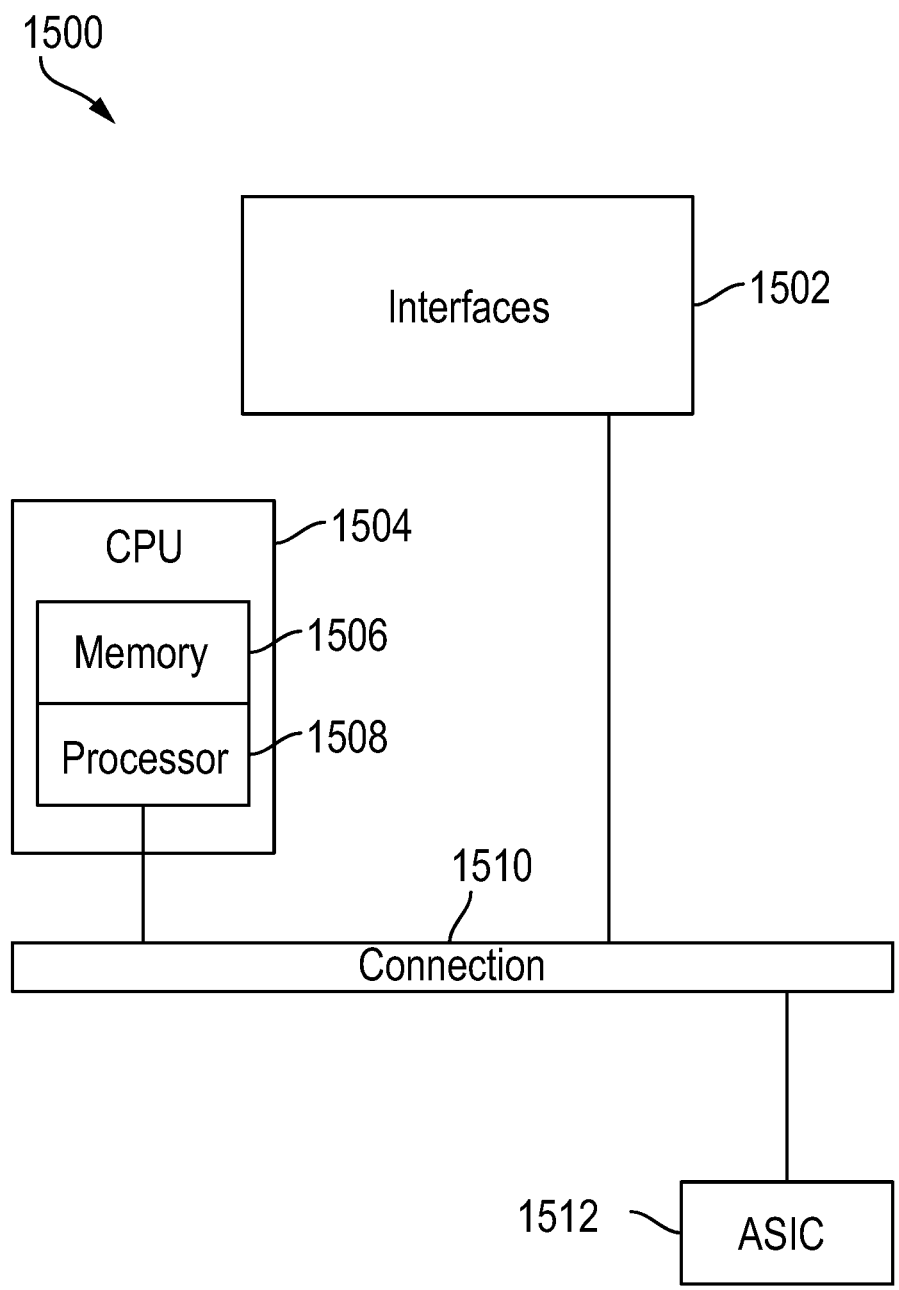
FIG. 15 illustrates an example network device in accordance with some examples of the disclosure.

FIG. 15 illustrates an example network device 1500 suitable for performing switching, routing, load balancing, and other networking operations. The example network device 1500 can be implemented as switches, routers, nodes, metadata servers, load balancers, client devices, and so forth.

Network device 1500 includes a central processing unit (CPU) 1504, interfaces 1502, and a bus 1510 (e.g., a peripheral component interconnect (PCI) bus). When acting under the control of appropriate software or firmware, the CPU 1504 is responsible for executing packet management, error detection, and/or routing functions. The CPU 1504 preferably accomplishes all these functions under the control of software including an operating system and any appropriate applications software. CPU 1504 may include one or more processors 1508, such as a processor from the INTEL X86 family of microprocessors. In some cases, processor 1508 can be specially designed hardware for controlling the operations of network device 1500. In some cases, a memory 1506 (e.g., non-volatile RAM, ROM, etc.) also forms part of CPU 1504. However, there are many different ways in which memory could be coupled to the system.

The interfaces 1502 are typically provided as modular interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, digital subscriber line (DSL) interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, high-speed serial interfaces (HSSI), point-of-sale (POS) interfaces, fiber distributed data interface (FDDI), WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 1504) to efficiently perform routing computations, network diagnostics, security functions, etc.

Although the system shown in FIG. 15 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1500.

Regardless of the network device's configuration, it may employ one or more memories or memory modules (including memory 1506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1506 could also hold various software containers and virtualized execution environments and data.

The network device 1500 can also include an ASIC 1512, which can be configured to perform routing and/or switching operations. The ASIC 1512 can communicate with other components in the network device 1500 via the bus 1510, to exchange data and signals and coordinate various types of operations by the network device 1500, such as routing, switching, and/or data storage operations, for example.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A method, comprising: receiving a request for a circuit policy between a source node and a destination node, the circuit policy defining a co-routed bidirectional policy between the source node and the destination node; requesting a path compute service to identify a path between the source node and the destination node that satisfies the circuit policy through a first network; receiving a path identifying a first set of network nodes that satisfy the circuit policy; configuring each node in the first set of network nodes within the first network with the circuit policy; and establishing a connection using the path that satisfies the circuit policy between the source node and the destination node, wherein a packet transmitted with the circuit policy includes addresses of at least a portion of the first set of network nodes in the packet.

Aspect 2: The method of Aspect 1, further comprising: determining a sub-policy for a network node of the first set of network nodes based on a capacity of another network node; and providing the sub-policy to the portion of the first set of network nodes.

Aspect 3: The method of any of Aspects 1 to 2, wherein an intermediary node between the source node and the destination node is configured to receive a packet traveling in either direction between the source node to the destination node and update the destination address in the packet based on a destination of the packet, the intermediary node being configured with the sub-policy.

Aspect 4: The method of any of Aspects 1 to 3, wherein the intermediary node updates the destination address to include nodes in the path between the intermediary node and the destination of the packet based on a maximum stack depth of addresses within the destination address.

Aspect 5: The method of any of Aspects 1 to 4, wherein the destination address comprises a list of adjacency identifiers that identify a portion of the path.

Aspect 6: The method of any of Aspects 1 to 5, wherein each node in the first set of network nodes enforces each connection requirement in the circuit policy.

Aspect 7: The method of any of Aspects 1 to 6, wherein a controller service is configured to store bandwidth accounting for nodes within at least the first network, and wherein the controller service is configured to identify network nodes that can satisfy the circuit policy.

Aspect 8. The method of any of Aspects 1 to 7, wherein the path compute service or the controller service is configured to identify a co-routed bidirectional standby path between the source node and the destination node that satisfy the circuit policy.

Aspect 9: The method of any of Aspects 1 to 8, further comprising: receiving a standby path including a second set of network nodes that satisfy the circuit policy.

Aspect 10: The method of any of Aspects 1 to 9, further comprising: after receiving the working path, requesting a second network to retrieve the working path from the path compute service, wherein the working path includes network nodes within the second network; and configuring each node in the second set of network nodes within the second network with the circuit policy.

Aspect 11: The method of any of Aspects 1 to 10, wherein the source node and the destination node are synchronized and configured to monitor the working path and the standby path for network connection failures after the circuit policy is installed in the nodes of the first network and the second network.

Aspect 12: The method of any of Aspects 1 to 11, further comprising: in response to detection of a network connection failure in the working path between the source node and the destination node, switching transmission of packets of the circuit policy to the standby path, wherein a destination address of the packets identifies at least a portion of the second set of network nodes.

Aspect 13: The method of any of Aspects 1 to 12, wherein the source node receives a forward segment list identifying the first set of network nodes from the source node to the destination node and a reverse segment list identifying the first set of network nodes from the destination node to the source node.

Aspect 14: The method of any of Aspects 1 to 13, wherein the source node and the destination node are configured to monitor the working path based on a loopback probe sent from the source node to the destination node and, in response to detecting a network connection failure based on failing to receive the loopback probe, iteratively send loopback probes to at least one node in the first set of network nodes to identify a location of the network connection failure.

Aspect 15: The method of any of Aspects 1 to 14, further comprising: detecting a traffic volume from the source node to the destination node that exceeds a bandwidth requirement of the circuit policy; requesting the path compute service to identify a supplemental path between the source node and the destination node that satisfy the circuit policy through the first network; establishing a supplemental persistent connection using a supplemental working path; and configuring the source node and the destination node to perform load balancing based on a result provided by the path compute service.

Aspect 16: The method of any of Aspects 1 to 15, further comprising: detecting a network connection failure in the working path or the supplemental working path; and in response to detection of the network connection failure in the working path or the supplemental working path, switching transmission of packets of the circuit policy to the standby path and a supplemental standby path.

Aspect 17: The method of any of Aspects 1 to 16, wherein the connection is persistent and does not change dynamically unless a network failure or the connection is reconfigured by a user.

Aspect 18: A network device includes a transceiver (e.g., a network interface, a wireless transceiver, etc.) and a processor coupled to the transceiver. The processor configured to execute instructions and cause the processor to: receive a request for a circuit policy between a source node and a destination node, the circuit policy defining a co-routed bidirectional policy between the source node and the destination node; request a path compute service to identify a path between the source node and the destination node that satisfies the circuit policy through a first network; receive a path identifying a first set of network nodes that satisfy the circuit policy; configure each node in the first set of network nodes within the first network with the circuit policy; and establish a connection using the path that satisfies the circuit policy between the source node and the destination node, wherein a packet transmitted with the circuit policy includes addresses of at least a portion of the first set of network nodes in the packet.

Aspect 19: The network device of Aspect 18, wherein the processor is configured to execute the instructions and cause the processor to: determine a sub-policy for a network node of the first set of network nodes based on a capacity of another network node; and provide the sub-policy to the portion of the first set of network nodes.

Aspect 20: The network device of any of Aspects 18 to 19, wherein an intermediary node between the source node and the destination node is configured to receive a packet traveling in either direction between the source node to the destination node and update the destination address in the packet based on a destination of the packet, the intermediary node being configured with the sub-policy.

Aspect 21: The network device of any of Aspects 18 to 20, wherein the intermediary node updates the destination address to include nodes in the path between the intermediary node and the destination of the packet based on a maximum stack depth of addresses within the destination address.

Aspect 22: The network device of any of Aspects 18 to 21, wherein the destination address comprises a list of adjacency identifiers that identify a portion of the path.

Aspect 23: The network device of any of Aspects 18 to 22, wherein each node in the first set of network nodes enforces each connection requirement in the circuit policy.

Aspect 24: The network device of any of Aspects 18 to 23, wherein a controller service is configured to store bandwidth accounting for nodes within at least the first network, and wherein the controller service is configured to identify network nodes that can satisfy the circuit policy.

Aspect 25: The network device of any of Aspects 18 to 24, wherein the path compute service or the controller service is configured to identify a co-routed bidirectional standby path between the source node and the destination node that satisfy the circuit policy.

Aspect 26: The network device of any of Aspects 18 to 25, wherein the processor is configured to execute the instructions and cause the processor to: receive a standby path including a second set of network nodes that satisfy the circuit policy.

Aspect 27: The network device of any of Aspects 18 to 26, wherein the processor is configured to execute the instructions and cause the processor to: after receiving the working path, request a second network to retrieve the working path from the path compute service, ein the processor is configured to execute the instructions and cause the processor to: after receiving the working path, request a second network to retrieve the working path from the path compute service, wherein the working path includes network nodes within the second network; and configure each node in the second set of network nodes within the second network with the circuit policy.

Aspect 28: The network device of any of Aspects 18 to 27, wherein the source node and the destination node are synchronized and configured to monitor the working path and the standby path for network connection failures after the circuit policy is installed in the nodes of the first network and the second network.

Aspect 29: The network device of any of Aspects 18 to 28, wherein the processor is configured to execute the instructions and cause the processor to: in response to detection of a network connection failure in the working path between the source node and the destination node, switch transmission of packets of the circuit policy to the standby path, wherein a destination address of the packets identifies at least a portion of the second set of network nodes.

Aspect 30: The network device of any of Aspects 18 to 29, wherein the source node receives a forward segment list identifying the first set of network nodes from the source node to the destination node and a reverse segment list identifying the first set of network nodes from the destination node to the source node.

Aspect 31: The network device of any of Aspects 18 to 30, wherein the source node and the destination node are configured to monitor the working path based on a loopback probe sent from the source node to the destination node and, in response to detecting a network connection failure based on failing to receive the loopback probe, iteratively send loopback probes to at least one node in the first set of network nodes to identify a location of the network connection failure.

Aspect 32: The network device of any of Aspects 18 to 31, wherein the processor is configured to execute the instructions and cause the processor to: detect a traffic volume from the source node to the destination node that exceeds a bandwidth requirement of the circuit policy; request the path compute service to identify a supplemental path between the source node and the destination node that satisfy the circuit policy through the first network; establish a supplemental persistent connection using a supplemental working path; and configure the source node and the destination node to perform load balancing based on a result provided by the path compute service.

Aspect 33: The network device of any of Aspects 18 to 32, wherein the processor is configured to execute the instructions and cause the processor to: detect a network connection failure in the working path or the supplemental working path; and in response to detection of the network connection failure in the working path or the supplemental working path, switch transmission of packets of the circuit policy to the standby path and a supplemental standby path.

Aspect 34: The network device of any of Aspects 18 to 33, wherein the connection is persistent and does not change dynamically unless a network failure or the connection is reconfigured by a user.

Aspect 35: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a request for a circuit policy between a source node and a destination node, the circuit policy defining a co-routed bidirectional policy between the source node and the destination node; request a path compute service to identify a path between the source node and the destination node that satisfies the circuit policy through a first network; receive a path identifying a first set of network nodes that satisfy the circuit policy; configure each node in the first set of network nodes within the first network with the circuit policy; and establish a connection using the path that satisfies the circuit policy between the source node and the destination node, wherein a packet transmitted with the circuit policy includes addresses of at least a portion of the first set of network nodes in the packet.

Aspect 36: The computer readable medium of Aspect 35, wherein the processor is configured to execute the computer readable medium and cause the processor to: determine a sub-policy for a network node of the first set of network nodes based on a capacity of another network node; and provide the sub-policy to the portion of the first set of network nodes.

Aspect 37: The computer readable medium of any of Aspects 35 to 36, wherein an intermediary node between the source node and the destination node is configured to receive a packet traveling in either direction between the source node to the destination node and update the destination address in the packet based on a destination of the packet, the intermediary node being configured with the sub-policy.

Aspect 38: The computer readable medium of any of Aspects 35 to 37, wherein the intermediary node updates the destination address to include nodes in the path between the intermediary node and the destination of the packet based on a maximum stack depth of addresses within the destination address.

Aspect 39: The computer readable medium of any of Aspects 35 to 38, wherein the destination address comprises a list of adjacency identifiers that identify a portion of the path.

Aspect 40: The computer readable medium of any of Aspects 35 to 39, wherein each node in the first set of network nodes enforces each connection requirement in the circuit policy.

Aspect 41: The computer readable medium of any of Aspects 35 to 40, wherein a controller service is configured to store bandwidth accounting for nodes within at least the first network, and wherein the controller service is configured to identify network nodes that can satisfy the circuit policy.

Aspect 42: The computer readable medium of any of Aspects 35 to 41, wherein the path compute service or the controller service is configured to identify a co-routed bidirectional standby path between the source node and the destination node that satisfy the circuit policy.

Aspect 43: The computer readable medium of any of Aspects 35 to 42, wherein the processor is configured to execute the computer readable medium and cause the processor to: receive a standby path including a second set of network nodes that satisfy the circuit policy.

Aspect 44: The computer readable medium of any of Aspects 35 to 43, wherein the processor is configured to execute the computer readable medium and cause the processor to: after receiving the working path, request a second network to retrieve the working path from the path compute service, wherein the working path includes network nodes within the second network; and configure each node in the second set of network nodes within the second network with the circuit policy.

Aspect 45: The computer readable medium of any of Aspects 35 to 44, wherein the source node and the destination node are synchronized and configured to monitor the working path and the standby path for network connection failures after the circuit policy is installed in the nodes of the first network and the second network.

Aspect 46: The computer readable medium of any of Aspects 35 to 45, wherein the processor is configured to execute the computer readable medium and cause the processor to: in response to detection of a network connection failure in the working path between the source node and the destination node, switch transmission of packets of the circuit policy to the standby path, wherein a destination address of the packets identifies at least a portion of the second set of network nodes.

Aspect 47: The computer readable medium of any of Aspects 35 to 46, wherein the source node receives a forward segment list identifying the first set of network nodes from the source node to the destination node and a reverse segment list identifying the first set of network nodes from the destination node to the source node.

Aspect 48: The computer readable medium of any of Aspects 35 to 47, wherein the source node and the destination node are configured to monitor the working path based on a loopback probe sent from the source node to the destination node and, in response to detecting a network connection failure based on failing to receive the loopback probe, iteratively send loopback probes to at least one node in the first set of network nodes to identify a location of the network connection failure.

Aspect 49: The computer readable medium of any of Aspects 35 to 48, wherein the processor is configured to execute the computer readable medium and cause the processor to: detect a traffic volume from the source node to the destination node that exceeds a bandwidth requirement of the circuit policy; request the path compute service to identify a supplemental path between the source node and the destination node that satisfy the circuit policy through the first network; establish a supplemental persistent connection using a supplemental working path; and configure the source node and the destination node to perform load balancing based on a result provided by the path compute service.

Aspect 50: The computer readable medium of any of Aspects 35 to 49, wherein the processor is configured to execute the computer readable medium and cause the processor to: detect a network connection failure in the working path or the supplemental working path; and in response to detection of the network connection failure in the working path or the supplemental working path, switch transmission of packets of the circuit policy to the standby path and a supplemental standby path.

Aspect 51: The computer readable medium of any of Aspects 35 to 50, wherein the connection is persistent and does not change dynamically unless a network failure or the connection is reconfigured by a user.

What is claimed is:

1. A method, comprising:
receiving a request for a circuit policy between a source node and a destination node, the circuit policy defining a co-routed bidirectional policy between the source node and the destination node;

requesting a path compute service to identify a path between the source node and the destination node that satisfies the circuit policy through a first network;
receiving a path identifying a first set of network nodes that satisfy the circuit policy;
configuring each node in the first set of network nodes within the first network with the circuit policy;
updating, by an intermediary node between the source node and the destination node, a destination address to include nodes in the path between the intermediary node and the destination node of a packet such that a stack size requirement is reduced to be less than or equal to a maximum stack depth of addresses within the destination address; and
establishing a connection using the path that satisfies the circuit policy between the source node and the destination node, wherein a packet transmitted with the circuit policy includes addresses of at least a portion of the first set of network nodes in the packet.

2. The method of claim 1, further comprising:
determining a sub-policy for a network node of the first set of network nodes based on a capacity of another network node; and
providing the sub-policy to the portion of the first set of network nodes.

3. The method of claim 2, wherein the intermediary node between the source node and the destination node is configured to receive the packet traveling in either direction between the source node to the destination node and update the destination address in the packet based on a destination of the packet, the intermediary node being configured with the sub-policy.

4. The method of claim 1, wherein the destination address comprises a list of adjacency identifiers that identify a portion of the path.

5. The method of claim 1, wherein each node in the first set of network nodes enforces each connection requirement in the circuit policy.

6. The method of claim 1, wherein a controller service is configured to store bandwidth accounting for nodes within at least the first network, and wherein the controller service is configured to identify network nodes that can satisfy the circuit policy.

7. The method of claim 1, wherein the path compute service or a controller service is configured to identify a co-routed bidirectional standby path between the source node and the destination node that satisfy the circuit policy.

8. The method of claim 1, wherein the connection is persistent and does not change dynamically unless a network failure or the connection is reconfigured by a user.

9. A network device comprising:
a transceiver;
a processor configured to execute instructions and cause the processor to:
receive a request for a circuit policy between a source node and a destination node, the circuit policy defining a co-routed bidirectional policy between the source node and the destination node;
request a path compute service to identify a path between the source node and the destination node that satisfies the circuit policy through a first network;
receive a path identifying a first set of network nodes that satisfy the circuit policy;
configure each node in the first set of network nodes within the first network with the circuit policy;
update, by an intermediary node between the source node and the destination node, a destination address to include nodes in the path between the intermediary node and the destination node of a packet such that a stack size requirement is reduced to be less than or equal to a maximum stack depth of addresses within the destination address; and
establish a connection using the path that satisfies the circuit policy between the source node and the destination node, wherein a packet transmitted with the circuit policy includes addresses of at least a portion of the first set of network nodes in the packet.

10. The network device of claim 9, wherein the instructions further cause the processor to:
determine a sub-policy for a network node of the first set of network nodes based on a capacity of another network node; and
provide the sub-policy to the portion of the first set of network nodes.

11. The network device of claim 10, wherein the intermediary node between the source node and the destination node is configured to receive the packet traveling in either direction between the source node to the destination node and update the destination address in the packet based on a destination of the packet, the intermediary node being configured with the sub-policy.

12. The network device of claim 9, wherein the destination address comprises a list of adjacency identifiers that identify a portion of the path.

13. The network device of claim 9, wherein each node in the first set of network nodes enforces each connection requirement in the circuit policy.

14. The network device of claim 9, wherein a controller service is configured to store bandwidth accounting for nodes within at least the first network, and wherein the controller service is configured to identify network nodes that can satisfy the circuit policy.

15. The network device of claim 9, wherein the path compute service or a controller service is configured to identify a co-routed bidirectional standby path between the source node and the destination node that satisfy the circuit policy.

16. The network device of claim 9, wherein the connection is persistent and does not change dynamically unless a network failure or the connection is reconfigured by a user.

17. A non-transitory computer readable medium comprising instructions, the instructions, when executed by a computing system, cause the computing system to:
receive a request for a circuit policy between a source node and a destination node, the circuit policy defining a co-routed bidirectional policy between the source node and the destination node;
request a path compute service to identify a path between the source node and the destination node that satisfies the circuit policy through a first network;
receive a path identifying a first set of network nodes that satisfy the circuit policy;
configure each node in the first set of network nodes within the first network with the circuit policy;
update, by an intermediary node between the source node and the destination node, a destination address to include nodes in the path between the intermediary node and the destination node of a packet such that a stack size requirement is reduced to be less than or equal to a maximum stack depth of addresses within the destination address; and
establish a connection using the path that satisfies the circuit policy between the source node and the destination node, wherein a packet transmitted with the circuit policy includes addresses of at least a portion of the first set of network nodes in the packet.

18. The non-transitory computer readable medium of claim 17, wherein the computer readable medium further comprises instructions that, when executed by the computing system, cause the computing system to:
   determine a sub-policy for a network node of the first set of network nodes based on a capacity of another network node; and
   provide the sub-policy to the portion of the first set of network nodes.

\* \* \* \* \*